(12) United States Patent
Laabs et al.

(10) Patent No.: US 11,515,950 B2
(45) Date of Patent: Nov. 29, 2022

(54) OVER-THE-AIR TESTING OF MILLIMETER WAVE ANTENNA ARRAYS

(71) Applicant: NATIONAL INSTRUMENTS CORPORATION, Austin, TX (US)

(72) Inventors: Martin Laabs, Dresden (DE); Dirk Plettemeier, Dresden (DE); Thomas Deckert, Dresden (DE); Johannes Dietmar Herbert Lange, Dresden (DE); Marc Vanden Bossche, Bornem (BE)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 17/464,170

(22) Filed: Sep. 1, 2021

(65) Prior Publication Data

US 2022/0077938 A1    Mar. 10, 2022

Related U.S. Application Data

(60) Provisional application No. 63/074,908, filed on Sep. 4, 2020.

(51) Int. Cl.
| | | |
|---|---|---|
| *H04B 17/00* | (2015.01) | |
| *H04B 17/10* | (2015.01) | |
| *H01Q 21/06* | (2006.01) | |

(52) U.S. Cl.
CPC .......... *H04B 17/104* (2015.01); *H01Q 21/06* (2013.01)

(58) Field of Classification Search
CPC .... H04B 17/101; H04B 17/104; H04B 17/11; H04B 17/21; H04B 17/26
See application file for complete search history.

(56) References Cited

U.S. PATENT DOCUMENTS

| | | |
|---|---|---|
| 4,980,636 A | 12/1990 | Romanofsky et al. |
| 6,191,744 B1 | 2/2001 | Snow et al. |

(Continued)

FOREIGN PATENT DOCUMENTS

| | | |
|---|---|---|
| CN | 107748298 A | 3/2018 |
| EP | 3264641 A1 | 1/2018 |

OTHER PUBLICATIONS

International Search Report and Written Opinion in International Application No. PCT/US2019/032233, dated Aug. 20, 2019, 12 pages.

(Continued)

*Primary Examiner* — Tuan Pham
(74) *Attorney, Agent, or Firm* — Kowert, Hood, Munyon, Rankin & Goetzel, P.C.; Luke S. Langsjoen

(57) ABSTRACT

A system and method for testing (e.g., rapidly and inexpensively) devices such as integrated circuits (IC) with integrated antennas configured for millimeter wave transmission and/or reception. The method may first perform a calibration operation on a reference device under test (DUT). The calibration operation may determine a set of reference DUT FF base functions and may also generate a set of calibration coefficients. After the calibration step using the reference DUT, the resulting reference DUT FF base functions and the calibration coefficients (or reconstruction matrix) may be used in determining far-field patterns of DUTs based on other field measurements, e.g., measurements taken in the near field of the DUT.

26 Claims, 11 Drawing Sheets

PAS Measurement Procedure

(56) References Cited

U.S. PATENT DOCUMENTS

| | | |
|---|---|---|
| 6,525,657 B1 | 2/2003 | Wojcik |
| 8,212,572 B2 | 7/2012 | Webb |
| 8,374,552 B2 | 2/2013 | Rupp et al. |
| 8,706,044 B2 | 4/2014 | Chang et al. |
| 8,868,021 B1 | 10/2014 | Feldman |
| 8,995,513 B1 | 3/2015 | Sandoval et al. |
| 9,065,609 B2 | 6/2015 | McCoy |
| 9,419,784 B2 | 8/2016 | Vanden Bossche |
| 9,459,295 B2 | 10/2016 | Wertz |
| 9,477,566 B2 | 10/2016 | Baker |
| 9,483,372 B2 | 11/2016 | Baker |
| 9,581,630 B2 | 2/2017 | Verbeyst et al. |
| 9,871,649 B2 | 1/2018 | Chopra et al. |
| 9,917,755 B1 | 3/2018 | Rullmann et al. |
| 9,985,733 B1* | 5/2018 | Lee ............... H04B 17/15 |
| 10,085,162 B2 | 9/2018 | Foegelle |
| 10,914,782 B2* | 2/2021 | Barthel ............. G01R 31/2841 |
| 2002/0127971 A1 | 9/2002 | Chen et al. |
| 2005/0283697 A1 | 12/2005 | Kang et al. |
| 2009/0153158 A1 | 6/2009 | Dunn |
| 2012/0212244 A1 | 8/2012 | Zhao et al. |
| 2012/0293379 A1 | 11/2012 | Nickel et al. |
| 2013/0178203 A1 | 7/2013 | Venkataraman |
| 2014/0161164 A1 | 6/2014 | Emmanuel et al. |
| 2014/0273873 A1 | 9/2014 | Huynh |
| 2014/0370821 A1 | 12/2014 | Guterman et al. |
| 2015/0177277 A1 | 6/2015 | Nickel et al. |
| 2017/0141619 A1 | 5/2017 | Linnartz |
| 2017/0356947 A1 | 12/2017 | Kurimoto et al. |
| 2018/0034566 A1 | 2/2018 | Tankielun et al. |
| 2018/0212695 A1* | 7/2018 | Kyrolainen ........ H04B 17/3912 |
| 2018/0267096 A1 | 9/2018 | Lindell et al. |
| 2018/0337738 A1 | 11/2018 | Wen et al. |
| 2019/0113556 A1 | 4/2019 | Kao |
| 2019/0353698 A1 | 11/2019 | DaSilva et al. |
| 2020/0028598 A1 | 1/2020 | Jing et al. |

OTHER PUBLICATIONS

Valdes et al., U.S. Appl. No. 16/141,697, titled "Hardware Timed Over-the-Air Antenna Characterization", filed Sep. 25, 2018, 72 pgs.

Valdes et al., U.S. Appl. No. 16/141,733, titled "Correlation of Device-Under-Test Orientations and Radio Frequency Measurements", filed Sep. 25, 2018, 74 pgs.

International Search Report and Written Opinion in International Application No. PCT/US2021/048682, dated Dec. 7, 2021, 9 pages.

* cited by examiner

OVER-THE-AIR TESTING OF MILLIMETER WAVE ANTENNA ARRAYS

PRIORITY CLAIM

This application claims benefit of priority to U.S. Provisional Patent Application No. 63/074,908, titled "Over-the-Air Testing of Millimeter Wave Antenna Arrays," filed Sep. 4, 2020, whose inventors are Martin Laabs, Dirk Plettemeier, Thomas Deckert, Johannes Lange, and Marc Vanden Bossche, and which is hereby incorporated by reference in its entirety as though fully and completely set forth herein.

INCORPORATION BY REFERENCE

U.S. patent application Ser. No. 16/168,650, titled "Over-the-Air Testing of Millimeter Wave Integrated Circuits with Integrated Antennas," filed Oct. 23, 2018, whose inventors are DaSilva, et al (US Patent Publication 2019-0353698) is hereby incorporated by reference in its entirety as though fully and completely set forth herein.

FIELD OF THE INVENTION

The present invention relates to the field of semiconductor testing, and more specifically, to testing of millimeter wave integrated circuits with integrated antennas.

DESCRIPTION OF THE RELATED ART

One key requirement for $5^{th}$ Generation (5G) communications is the support of very high data rates. One option to enable higher data rates is to increase the system bandwidth on the order of 1-2 GHz. Contiguous wide bandwidth is in particular available at higher millimeter wave frequencies such as 24 GHz and above. To overcome the high pathloss at those frequencies, antenna array technology is used to steer the radiated energy to a specific direction.

Thus, as $5^{th}$ generation (5G) wireless technology has become more widespread, beamforming millimeter wave technology has rapidly grown in importance. Current user equipment devices, e.g., cell phones, use integrated circuits with integrated antenna arrays for transmitting and/or receiving millimeter wave signals. These antenna arrays need to be characterized and tested over-the-air (OTA) to determine if they satisfy various regulatory requirements.

In particular, smartphones with millimeter wave support are much more challenging to realize than infrastructure components such as base stations because one has to overcome the high blockage through hands etc. Therefore, multiple antenna-in-package (AiP) modules are needed per device. If one assumes 3-4 AiP modules per premium smartphone, one arrives at test volumes of >200M AiP units per year.

Such antenna arrays are often characterized in anechoic chambers and with a distance R between the probe antenna and the device under test (DUT) to approximate far-field (FF) conditions for the propagation of the electromagnetic waves. One challenge with that testing approach is that the required FF distance R is physically large thus making the size of the anechoic chamber large in turn increasing the cost of testing. The minimum distance R for approximating FF conditions depends on the antenna aperture D and the wavelength λ, as $$R=2D^2/\lambda$$

A bigger antenna aperture obviously leads to a larger far-field distance. For distances less than the far-field distance, the electrical field may not be planar, and measurements may not represent accurately the far-field specifications in the regulatory requirements. Various small anechoic chambers and associated methods exist to reduce the size and cost of the test equipment while still creating FF conditions. However, the potential for such reduction in size and cost is limited.

Large test volumes may benefit from a completely new test approach. OTA testing using small chamber-based approaches would be prohibitively costly. A viable method should combine the capability to test a larger number of devices with the possibility to correlate test results to device validation measurements at a reasonable price.

Present methods for testing the antennas on these integrated circuits are slow, expensive, and/or suffer various drawbacks such that they are unable to economically test a sufficiently large number of antenna arrays. Improvements in the field, in particular, regarding the size, cost, and speed of a test system for automated production testing of modules and devices integrating active antenna arrays, are desired.

SUMMARY OF THE INVENTION

Various embodiments are presented below of a system and method for testing (e.g., rapidly and inexpensively) devices such as integrated circuits (IC) with integrated antennas configured for millimeter wave transmission and/or reception.

The method may first perform a calibration operation on a reference device under test (DUT). The calibration operation may determine a set of reference DUT FF base functions and may also generate a set of calibration coefficients.

The calibration step may determine the set of reference DUT FF base functions by obtaining a set of reference DUT FF patterns generated by a plurality of antenna elements of a reference DUT under a set of different beamformer settings. The set of reference DUT FF patterns may be useable to enable the calculation of any beamformer setting-specific FF pattern as a linear combination of the set of reference DUT FF patterns. The set of reference DUT FF patterns may comprise the set of reference DUT FF base functions. The calibration step may generate the calibration coefficients by obtaining a series of a plurality of reference DUT field measurements of the wireless signals generated by the reference DUT under the set of different beamformer settings, and processing the series of the plurality of reference DUT field measurements. In some embodiments, the calibration coefficients may take the form of a matrix, called herein the reconstruction matrix.

After the calibration step using the reference DUT, the resulting reference DUT FF base functions and the calibration coefficients (or reconstruction matrix) may be used in determining far-field patterns of DUTs based on field measurements that are not far-field, e.g., near-field measurements. The measurement operation may thus comprise a method for determining a far-field (FF) pattern of wireless signals generated by a device under test (DUT), based on non-far-field (e.g., NF) measurements and information generated in the calibration step. The DUT may include an antenna array comprising a plurality of DUT antenna elements. The measurement (or run-time) method may operate as follows:

First the measurement method may obtain a plurality of DUT field measurements of the wireless signals generated by the DUT. These measurements may be performed by a probe antenna system (PAS) having a plurality of PAS antenna elements. The plurality of PAS elements may be equal to or greater than the plurality of DUT antenna elements. The measurement method may then compute a set of DUT FF scaling factors, using the plurality of DUT field measurements and the set of calibration coefficients produced in the calibration phase. The quantity of the set of DUT FF scaling factors may be equal to a quantity of a set of reference DUT FF base functions. In some embodiments, the calibration coefficients are first converted into the format of a reconstruction matrix, and the reconstruction matrix is used in place of the calibration coefficients. The measurement method may then determine (or estimate) the FF pattern of wireless signals of the DUT based on the DUT FF scaling factors and the set of reference DUT base functions. The FF pattern of wireless signals generated by the DUT are useable to assess operation of the DUT in the FF.

The wireless signals generated by the DUT for which the FF pattern may be determined may be unmodulated single-tone or multi-tone signals, or modulated signals where the modulation process may affect amplitude, frequency, and/or phase of the signals. Furthermore, these wireless signals may be continuous waves or intermittent and may occupy narrow or wide bandwidth.

BRIEF DESCRIPTION OF THE DRAWINGS

A better understanding of the present invention can be obtained when the following detailed description of the preferred embodiment is considered in conjunction with the following drawings, in which.

Figure 1:
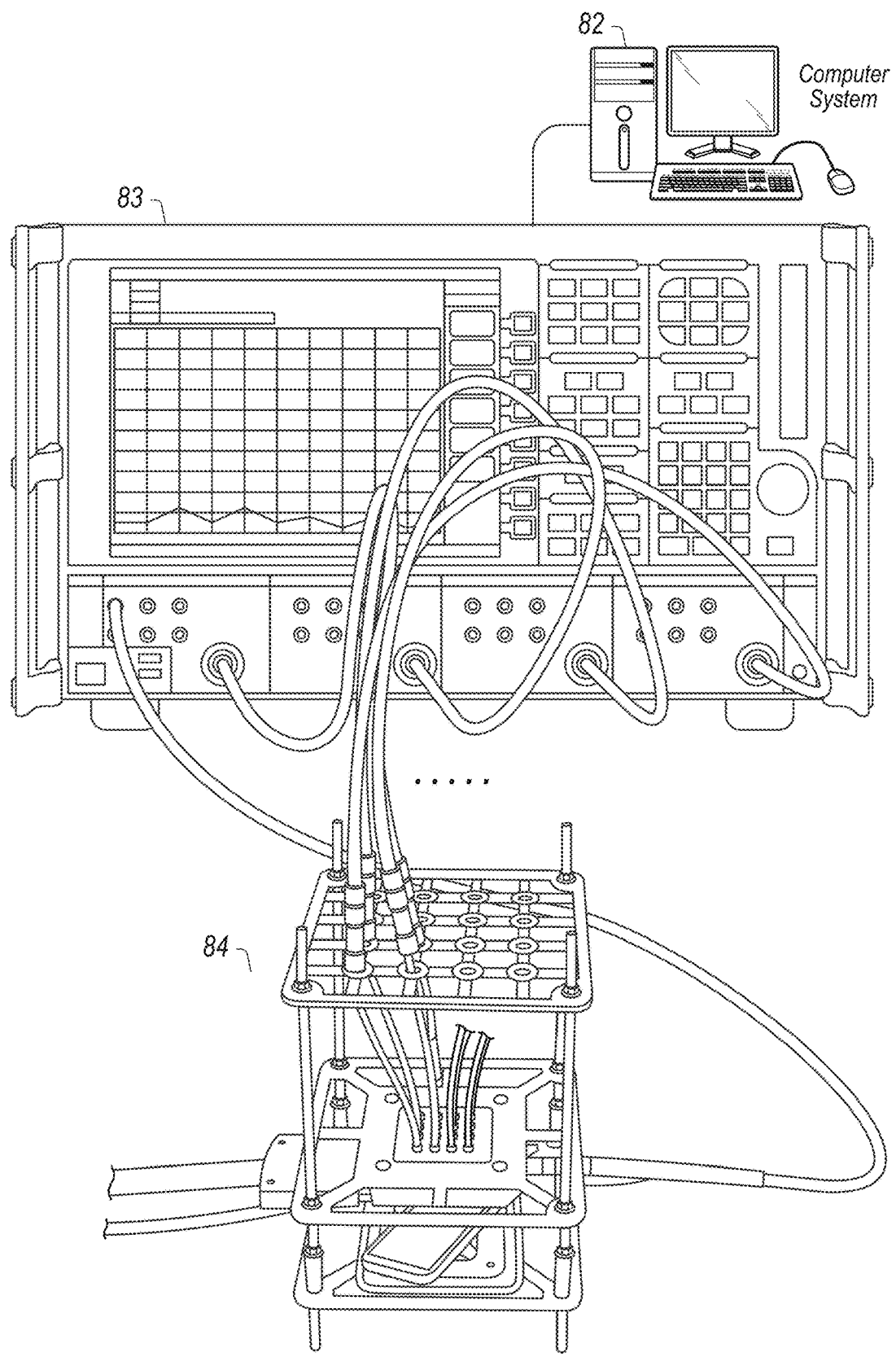
FIG. 1 illustrates an over the air (OTA) testing configuration, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Acronyms

The following is a listing of the acronyms used in the present application:
DUT: Device Under Test
EIRP: Effective Isotropic Radiated Power
FF: Far-Field
IF: Intermediate Frequency
NF: Near-Field
OTA: Over-the-Air
PAS: Probe Antenna System
RF: Radio Frequency
TRP: Total Radiated Power
VNA: Vector Network Analyzer Terms The following is a glossary of terms used in the present application:

Memory Medium—Any of various types of non-transitory computer accessible memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. A measurement device may also optionally be further configured as a signal generator to generate signals for provision to a device-under-test. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, a signal generator, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Wireless—refers to a communications, monitoring, or control system in which electromagnetic or acoustic waves carry a signal through space rather than along a wire.

Approximately—refers to a value being within some specified tolerance or acceptable margin of error or uncertainty of a target value, where the specific tolerance or margin is generally dependent on the application. Thus, for example, in various applications or embodiments, the term approximately may mean: within 0.1% of the target value, within 0.2% of the target value, within 0.5% of the target value, within 1%, 2%, 5%, or 10% of the target value, and so forth, as required by the particular application of the present techniques.

Far-Field (FF) pattern—a pattern of electromagnetic radiation that exists (or is presumed to exist) in a far field region around an object generating the electromagnetic radiation. An antenna, or a plurality of antenna elements, driven by a signal create electromagnetic fields. In general, the observed amplitude and phase of the electromagnetic fields varies with distance of the observer from the radiating object and with angular direction from the object to the observer. The FF pattern refers to the far field pattern of electromagnetic fields around the antenna (or the object containing the antenna), and references the fact that amplitude and phase of these fields observed at some distance from the radiating object and taken relative to a reference point at the same distance will be independent of distance from the object. The FF pattern or gain is a well-known electromagnetic concept.

Probe antenna system (PAS)—a plurality of antenna probes and potentially supporting parts modifying the collective properties the antenna probes and parts are presenting to the electromagnetic radiation associated with wireless signals and giving structural integrity to their assembly, and which may be used to measure the wireless signals generated by the DUT.

Probe-based field measurement, or field probe measurement of wireless signals—an electromagnetic field measurement made with an antenna probe which is part of the PAS. The measurement may comprise determining amplitude and phase of the wireless signals present at the antenna probe. A plurality of probe-based field measurements is the collection of the measurements of all antenna probes belonging to the PAS wherein all these measurements may be made for the same one or more wireless signals present at the PAS. Here "same wireless signals" may refer to the case where the arrangement and configuration of the DUT, the measurement instrumentation, supporting equipment, and ambient environmental conditions are the same for the measurements made with all the antenna probes of the PAS. Different embodiments may choose to make these measurements in various ways and various order, e.g., may perform the measurements on all antenna probes simultaneously or in successive order. A series of a plurality of probe-based field measurements corresponds to multiple of the plurality of probe-based field measurements wherein each one may be made for different wireless signals present at the PAS. A field probe measurement may be a near-field probe measurement when the PAS and the source of the wireless signal are separated by a near-field distance (either a reactive or radiating near-field distance), and it may be a far-field probe measurement when the separation is a far-field distance.

FIG. 1—OTA Testing System

FIG. 1 illustrates an over the air (OTA) testing system configured to implement embodiments of the techniques disclosed herein, according to some embodiments. Embodiments of a method for OTA testing (e.g., for production testing of integrated circuits) are described below. The system and method for OTA testing may utilize a near field to far field (NF-FF) reconstruction technique as described herein.

Note that various embodiments of the techniques disclosed herein may be implemented in a variety of different ways. For example, the methods described herein may be performed by software executing on a computer system. However, while some embodiments are described in terms of one or more programs executing on a computer, these embodiments are exemplary only, and are not intended to limit the techniques to any particular implementation or platform. Thus, for example, in some embodiments, the techniques may be implemented on or by a functional unit (also referred to herein as a processing element), which may include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

As shown in FIG. 1, the OTA test system may include a computer system 82 which couples to a testing apparatus 84. In FIG. 1 the computer system is shown as being a standalone computer system separate from the measurement chassis 83. The measurement chassis may in turn be coupled to a testing apparatus 84. Alternatively, the computer may be implemented in the measurement chassis 83. For example, the computer may be implemented as a board or module inserted into a PXI (PCI eXtensions for Instrumentation) chassis form factor. Any of various types of computer system and/or chassis configuration may be used.

Figure 2:
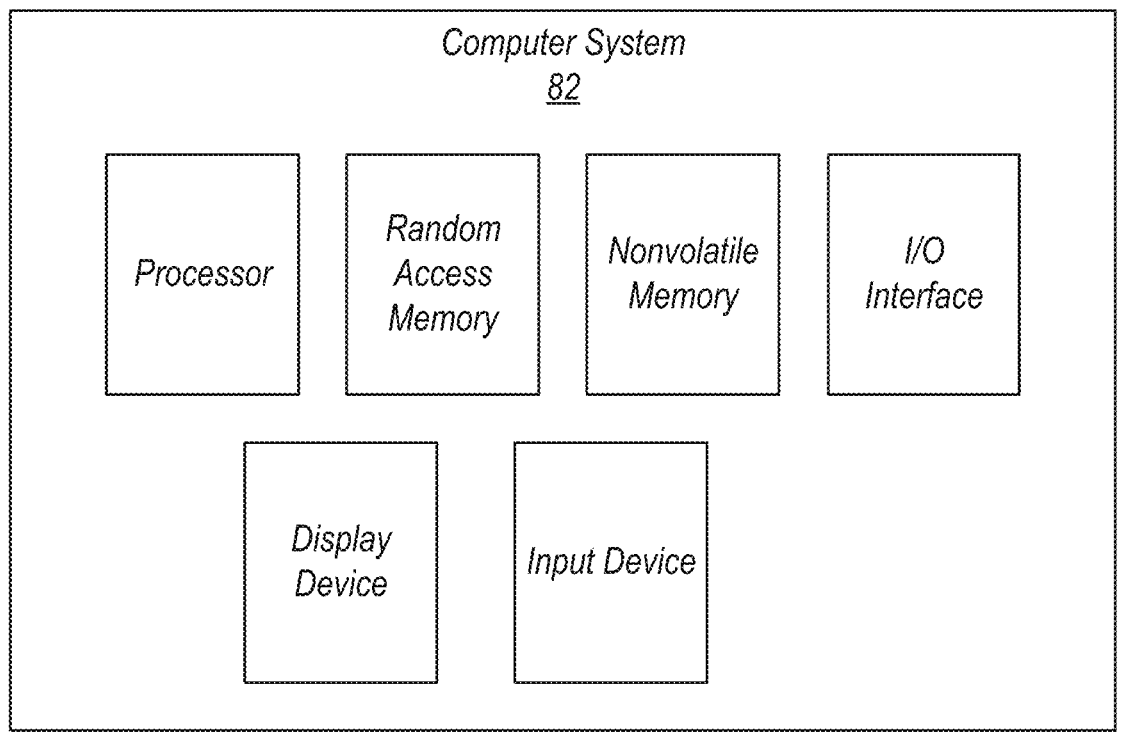
FIG. 2 shows a basic computer system block diagram.

As shown in FIG. 2, the computer system 82 may include a processor, random access memory (RAM), nonvolatile memory, a display device, an input device and an I/O interface for coupling to the testing apparatus 84. For example, the computer system 82 may include at least one memory medium on which one or more computer programs or software components according to one embodiment of the present invention may be stored. For example, the memory medium may store one or more programs that are executable to perform the methods described herein. The memory medium may also store operating system software, as well as other software for operation of the computer system. Various embodiments further include receiving or storing instructions and/or data implemented in accordance with the foregoing description upon a carrier medium.

The testing apparatus 84 may comprise a structure designed to receive a device under test (DUT). The DUT may be an antenna array chip, e.g., a chip which comprises a plurality of antennas, each antenna for generating electromagnetic radiation. The DUT may also be a user equipment, such as a cell phone, or other chip or device that has one or more antennas. The testing apparatus may also comprise a PAS designed to be placed proximate to the DUT for measuring electromagnetic signals produced by the plurality of antennas of the DUT. These measured electromagnetic signals are preferably not far-field signal measurements, and in some embodiments are near field (NF) measurements. The computer system 82 may be coupled to provide one or more stimulus signals to the DUT to selectively cause the various antennas to produce electromagnetic radiation. The PAS may be configured to measure the NF electromagnetic signals produced by the antennas of the DUT and may provide these measured NF electromagnetic signals to the computer system 82 for processing.

In the embodiment shown in FIG. 1, for ease of illustration, only a subset of the DUTs in the testing apparatus 84 are shown as being coupled to the measurement chassis (only a subset of the total number of wires between the testing apparatus 84 and the chassis 83 are shown). However, it is noted that in a typical system all of the antennas in the DUT of the testing apparatus 84 would be coupled to the measurement chassis 83.

The computer system 82 may perform a novel NF-FF reconstruction method described herein to produce FF electromagnetic signal values from the received NF electromagnetic signal measurements. The novel NF-FF reconstruction method is described further below.

FIG. 2—Computer System Block Diagram

FIG. 2 illustrates a simplified block diagram of the computer system 82. As shown, the computer system 82 may comprise a processor that is coupled to a random access memory (RAM) and a nonvolatile memory. The computer system 82 may also comprise an input device for receiving user input and a display device for presenting output. The computer 82 may also comprise an Input/Output (I/O) interface that is coupled to the testing apparatus 84. The I/O interface may be configured to supply signals to the DUT in the testing apparatus 84 to selectively stimulate the antennas on the DUT to generate electromagnetic radiation. The I/O interface may further be coupled to the PAS and configured to receive electromagnetic signals measured by the PAS.

Figure 4:
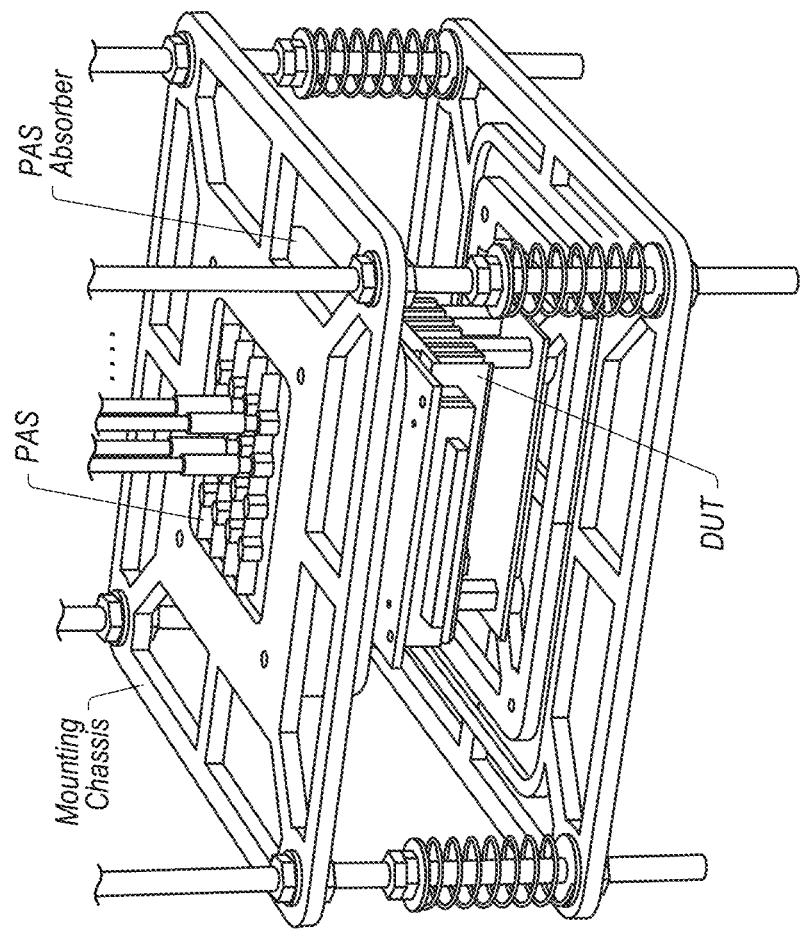
FIGS. 3-4 show examples of a testing apparatus which may support or house a device under test (DUT) and which may also include a probe antenna system (PAS) for measuring electromagnetic signals from the DUT, according to some embodiments.
Figure 3:
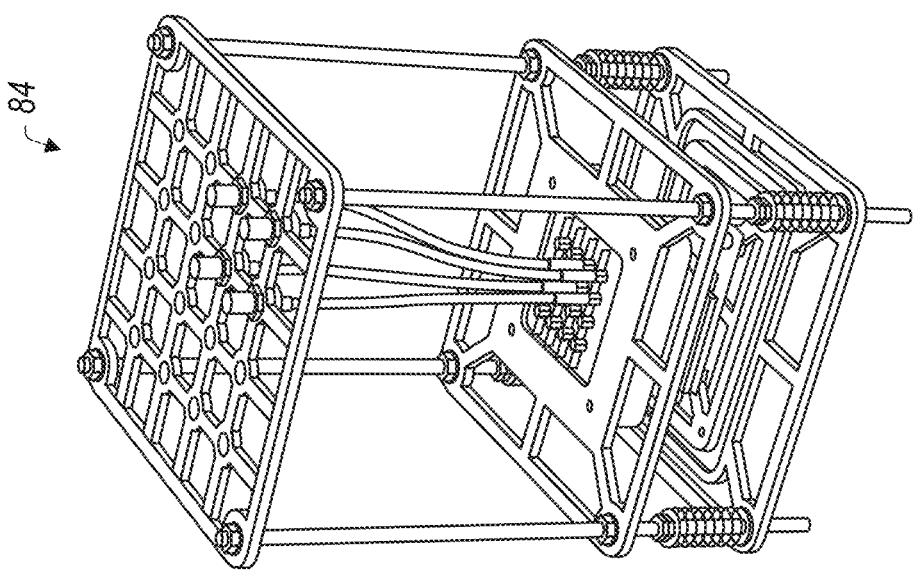

FIGS. 3-4: Testing Apparatus

FIG. 3 shows an embodiment of the testing apparatus 84, and FIG. 4 illustrates the embodiment of FIG. 3 in greater detail. As noted above in FIG. 1, for ease of illustration only a subset or portion of the wires are shown as being connected to the DUT in FIGS. 3 and 4. As shown in FIG. 3, the testing apparatus 84 may comprise a mounting chassis which is configured to support or hold a PAS Array for measuring near field electromagnetic signals from a DUT. The testing apparatus 84 may also comprise an absorber positioned around the PAS for absorbing undesired electromagnetic signals during the electromagnetic radiation measurements.

As shown in FIG. 4, the mounting chassis is also configured to support or hold a DUT underneath and proximate to the PAS. The testing apparatus 84 may also comprise a first connector coupled to the DUT and also coupled to the computer system 82 for enabling the computer system to provide stimulus signals to the DUT, thereby causing the antenna on the DUT to generate electromagnetic signals. The testing apparatus 84 may also comprise a second connector coupled to the PAS and also coupled to the computer system 82 for enabling the computer system to receive the electromagnetic signals measured by the PAS.

Figure 5:
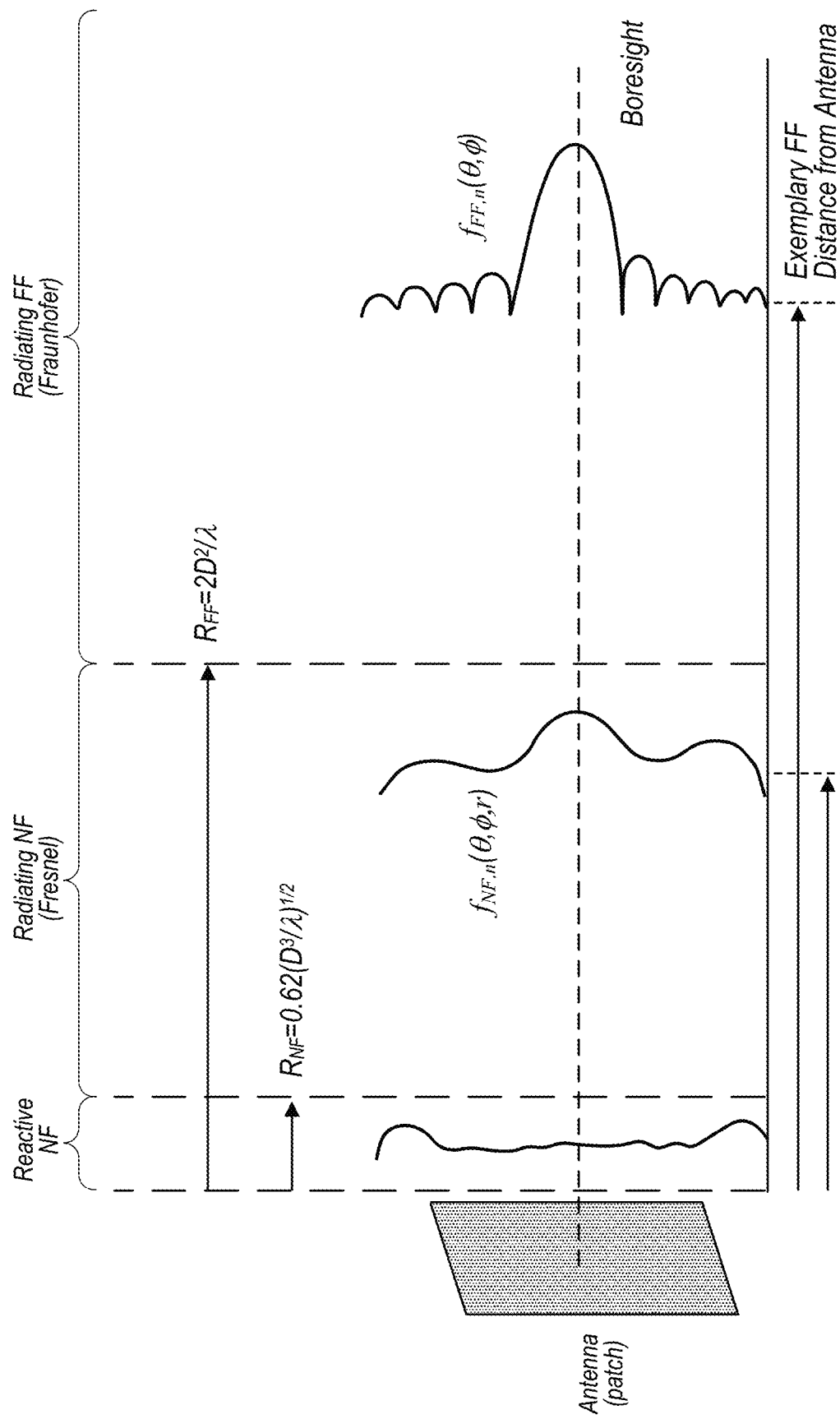
FIG. 5 illustrates field definitions related to wavelength and aperture size.

FIG. 5—Field Definitions

FIG. 5 illustrates various field definitions. There are two main distances that play an important role for OTA measurements. First the distance $R_{NF}$ where the reactive NF goes into the radiating NF as well as the distance $R_{FF}$ where the radiating NF goes into the (radiating) FF. For common OTA measurements $R_{FF}$ is most relevant because this is the distance that one can usually assume between a base station and a user terminal. Both distances depend on the antenna aperture size D and wavelength $\lambda$ and represent approximations. Details on how these borders are defined can be found, e.g., in the book from C. A. Balanis titled "Antenna Theory—Analysis and Design".

If one assumes a millimeter wave antenna at 28 GHz ($\lambda$=c/fc=($3^8$ m/s)/($28^9$ 1/s)=0.0107 m) one could obtain the following NF and FF distances:

$$D=\lambda/2\approx 5.3 \text{ mm} \rightarrow R_{NF}=2.3 \text{ mm}; R_{FF}=5.3 \text{ mm} \quad 1)$$

$$D=10\lambda/2\approx 5.3 \text{ cm} \rightarrow R_{NF}=7.4 \text{ cm}; R_{FF}=53 \text{ cm} \quad 2)$$

One immediately sees that there is a significant difference whether to look at a single element antenna that is represented by example (1) or an antenna array that is represented by example (2).

In the FF, the electromagnetic field almost entirely comprises components that make the direction of power flux pointing strictly away from the source of radiation (e.g., a DUT's antenna), i.e., the field may be composed of radiating components only. One consequence of this is that the shape of the distribution of field strength both, in amplitude and phase, over space may be practically independent of the distance between the source of radiation and the observer. In other words, the distributions measured for two different distances in the FF may be (approximately) equal if normalized, e.g., to their individual peak values; the actual scaling of the non-normalized distributions may still depend on the distance. The shape of this distribution of field strength is often referred to as the (FF) pattern of the source antenna and is an important characteristic of a radiating DUT. If the probe antenna may be placed in the FF of the DUT then the DUT's FF pattern may be measured directly with the probe by repositioning the DUT and/or probe relatively to each other to a plurality of points on a sphere around the DUT.

In the NF, the closer the observer gets to the radiating source, the more the electromagnetic field will be impacted by reactive components such that more significant portions of power go back and forth between the radiating source and points in its NF. This results in the distribution of field strength both, in amplitude and in phase, over space being dependent on the distance between source and observer in both, absolute value and shape. This also means that, in general, a probe antenna in the NF of the DUT antenna may be coupled to the DUT antenna and its presence may alter the properties of the electromagnetic fields radiating from the DUT.

OTA measurements in the radiating NF are possible with low coupling between the probe and DUT antenna, i.e., the presence of the probe antenna does not alter significantly the properties of the electromagnetic fields radiating from the DUT (this is different in the reactive NF where there is more coupling and the probe antenna does alter the DUT's radiation properties). Still, the shape of the distribution of field strength may still depend on the distance to the antenna.

However, one can use the classical NF-FF transformation known from literature to obtain the FF data. The drawback in this technique is that in particular for antenna arrays one has to spatially sample the field in the order of $\lambda/2$ down to $\lambda/10$ distances to obtain all of the necessary information to apply the NF-FF transformation. Furthermore, the classical NF-FF transformation is computationally complex.

In this text, the unqualified term "near field" (NF) encompasses both the reactive and the radiating NF.

Embodiments

Embodiments of the invention may comprise:

1) Design of a non-far field probe antenna system (PAS) that measures in the non-far field of a DUT. For example, some embodiments may be intended to operate in the radiating NF of a single antenna element (out of the plurality of antennas in the DUT's active antenna array) to be able to position the PAS very close, in terms of multitudes of wavelengths of the wireless signals, to the DUT's antenna. Some embodiments may ensure that the PAS structure attenuates the cross coupling between the neighboring antenna elements as much as possible. This design may specifically include a specific absorber structure.

2) Use of a NF-FF transformation method which exploits the linearity between specific measurements in the NF and in the FF to reconstruct the FF pattern and related properties of the DUT antenna array from NF measurements. The linear mapping relationship can be estimated in a calibration step and can be used for other antennas of the same type. The so-estimated mapping translates a set of NF measurements into the equivalent FF pattern. In some embodiments, the linear mapping relationship may take the form of a NF-FF reconstruction matrix and may utilize superposition of single element beam patterns in order to translate a set of NF measurements into their FF equivalent.

The combination of these two ideas may allow for a very compact socket like test apparatus where one can still measure the full FF beam pattern including amplitude and phase information but avoid use of a large anechoic measurement chamber. This compact size allows OTA measurements to be made in a fraction of the space. It also has the potential to be significantly lower cost and, because of the multiple antenna elements, may be able to significantly improve test time.

PAS Design

Figure 6:
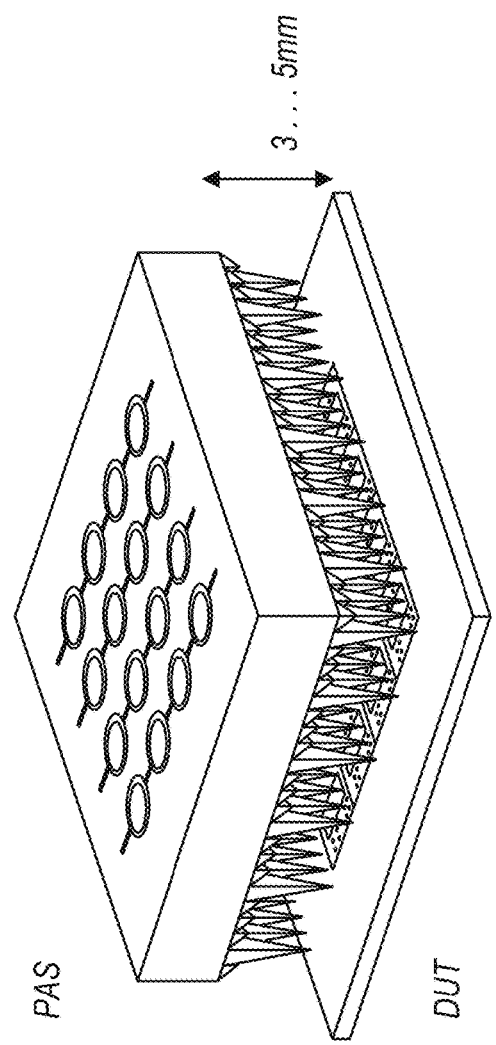
FIG. 6 shows the PAS interfacing with the DUT.
Figure 7:
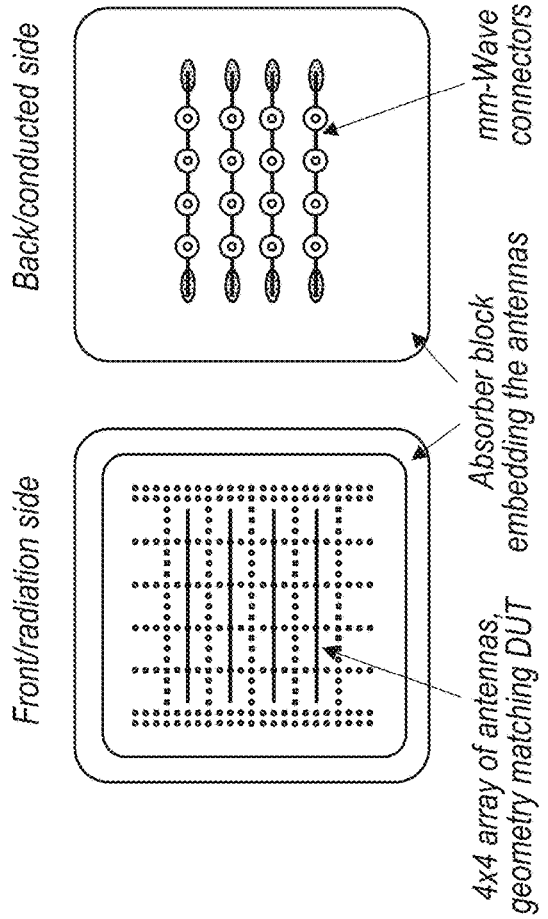
FIG. 7 shows front and back of an example embodiment of the PAS.

FIG. 6 illustrates an embodiment of the Probe Antenna System (PAS) positioned above (or mounted above) a DUT. FIG. 7 shows an embodiment of the PAS, where the left side of FIG. 7 shows the bottom of the PAS and the right side of FIG. 7 shows the top of the PAS. In this embodiment, the PAS comprises a plurality (e.g., 16) probe antenna elements with SMPM RF connectors embedded into a solid RF absorbing material. As shown in FIG. 6, the PAS may be placed above the DUT in such a way that each antenna in the PAS is above a respective or corresponding DUT antenna element, and hence each antenna in the PAS is configured to measure electromagnetic signals generated by its respective or corresponding DUT antenna element.

Figure 8:
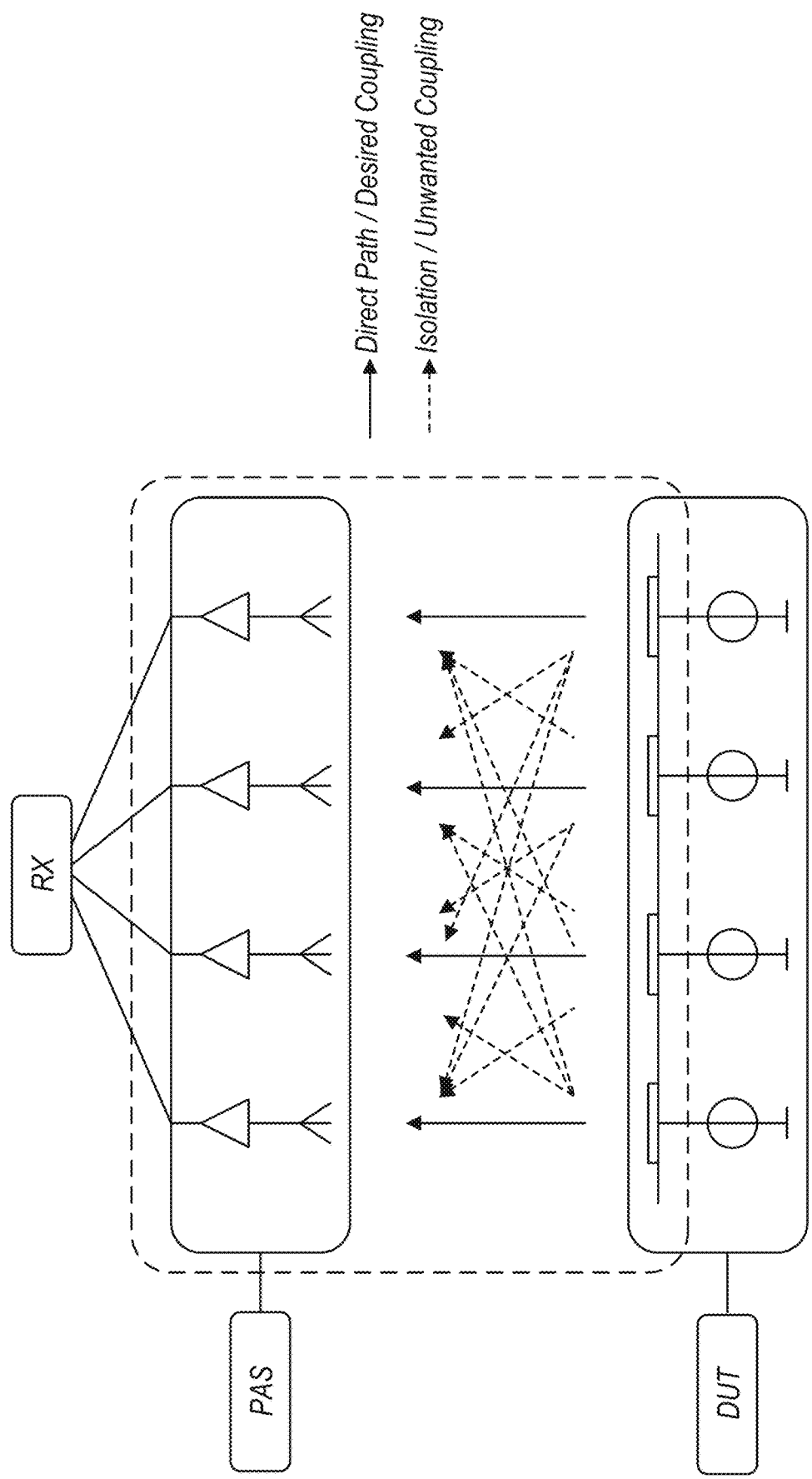
FIG. 8 illustrates various types of couplings between the PAS and the DUT.

FIG. 8 illustrates the direct path and the unwanted coupling of transmissions between the DUT and the PAS. As shown, the direct path represents a desired coupling of electromagnetic signals between the PAS and the DUT, and the "isolation" represents unwanted coupling of electromagnetic signals between the PAS and the DUT. Thus, as shown, it is desired for each measurement antenna element in the PAS to receive a signal from its corresponding antenna on the DUT, while minimizing interference from other non-corresponding antennas on the DUT.

The PAS may be designed to cause minimal disturbance of the single element DUT antenna input impedance when making a measurement with the PAS. A change in the antenna input impedance can be caused by the following effects:

1. Dielectric loading of the antenna, thus changing the field within the reactive near field resulting in a change input impedance.
2. Reflection of the signal from e.g. the PAS back to the antenna, resulting in a superposition of the incident and reflected wave, thus changing the effective load impedance.
3. Change in the inter-element coupling when array elements are excited with a phase/amplitude shifted input signal resulting in a different superposition of the incident and coupled signal, thus changing the active load impedance.

In some embodiments, the PAS may not increase or decrease this coupling significantly.

To aid the isolation between adjacent antennas and avoid reflections of the transmitted signal from the DUT the probe antennas may be surrounded by an absorbing material.

Different embodiments may use various antenna structures in the PAS to improve performance against the design criteria. Such antenna structures include, e.g.;

1. Yagi antennas may help with high directivity towards the opposite DUT antenna element but the metallic directors may increase coupling between the adjacent probe antennas and may add reactive near field disturbance;
2. Antipodal Vivaldi antennas may ease broadband operation with good matching over a large range of frequencies, may reduce adjacent coupling but with large aperture may increase the potential for reflections;
3. Horn antennas may be favored because of very good coupling between DUT antenna element and PAS element and excellent isolation especially with dielectric filling but such filling may create strong reflections off of the PAS element and, thus, unduly alter the DUT impedance.

The PAS antenna elements and the array may be implemented in several ways. In some embodiments, the PAS array may be built from individual antenna elements. In other embodiments, a plurality of antenna elements may be realized as a single module. In one particular embodiment, shown in FIG. 9, four elements are arranged together on a single multi-layer printed circuit board and the entire array is built from four such modules.

Figure 9:
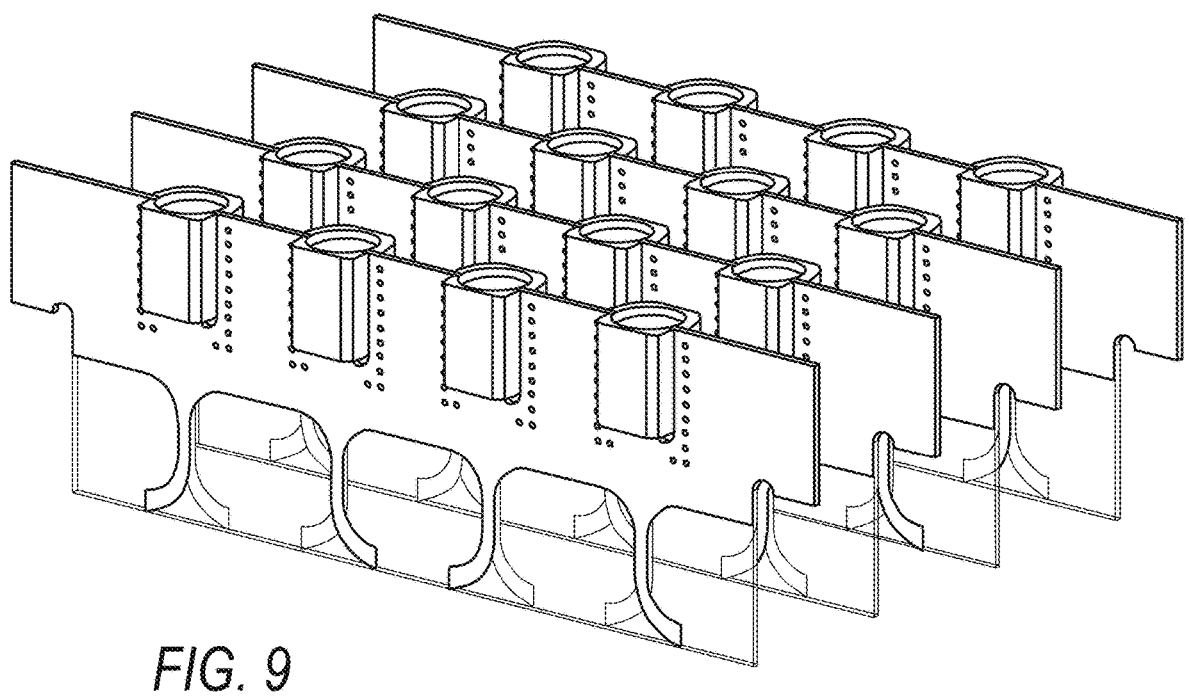
FIG. 9 illustrates a PAS antenna array without an absorbing structure and revealing the periodic mirrored arrangement of the antenna elements.

In some embodiments, the PAS comprises antipodal antennas with integrated balun. The antipodal antenna structure may be largely or mostly symmetrical but the balun structure may introduce a slight asymmetry. This may lead to a non-uniform coupling of the unwanted DUT-PAS paths. This non-uniform coupling does not significantly affect operation. As shown in FIG. 9, in some embodiments the PAS design includes a periodical mirrored arrangement of the antenna which may resolve this issue.

The design of the absorbing structure between the PAS antennas may incorporate an absorbing material that implements a trade-off between inter-PAS-element isolation and (dielectric) loading of the DUT antennas. Too little absorbing material may lead to insufficient isolation between the PAS antenna elements. Too much absorbing material changes the impedance of the DUT antenna above the given limit. The shape of the absorbing material is important as well as the volume. To achieve good absorption behavior and thus minimize the reflected energy, the PAS design may include a large surface with less parallel and/or 90° corners with respect to the direction of the energy flux of the electromagnetic radiation.

In one embodiment, the PAS antennas could be cast directly into the absorbing structure. Direct casting of the antennas into the absorbing structure may simplify the manufacturing. However direct contact of the absorbing material with the RF transmission lines connecting the PAS antenna elements may increase losses on these transmission lines, especially with microstrip transmission lines.

If this is undesirable, another embodiment may leave some small absorber-free region in the absorber structure around and close to the RF transmission lines.

Figure 10:
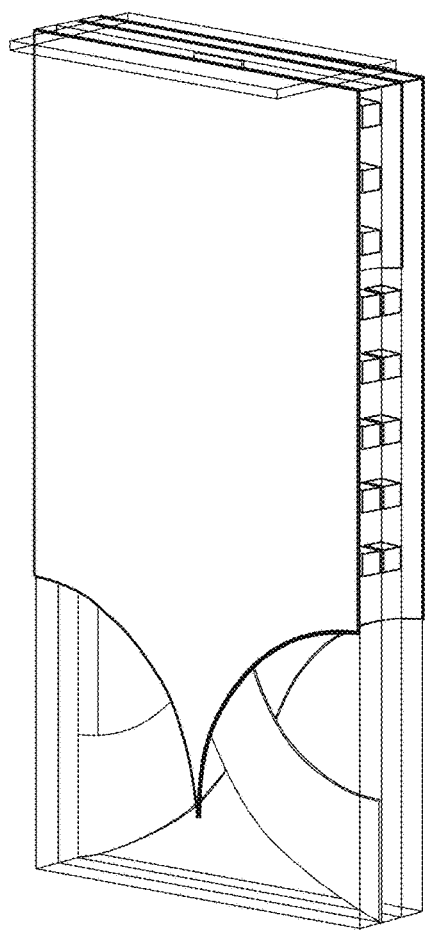
FIG. 10 illustrates an antipodal antenna of the PAS with stripline feeding, according to some embodiments.

Still other embodiments may optimize RF transmission line losses in various other ways. One example may be to use stripline transmission lines, as shown in FIG. 10, which may prevent the electromagnetic field from penetrating the absorbing material.

PAS Receiver Design

In order to perform measurements with the PAS, it may be connected with a measurement receiver system which can be implemented in various ways. Some embodiments may choose to implement parallel receiving circuitry, one per PAS antenna element, to simultaneously take measurements on all of the PAS antenna elements. An example is shown in Figure R-A. Other embodiments may use a switched architecture where one receiver circuit is used to successively take measurements in turn on each of the PAS antenna elements. An example is shown in Figure R-B.

Switching receiver designs may employ traditional "hard" switches such that only the signal picked up by one PAS antenna element is processed by the measurement receiver. An example is shown in Figure R-B. Other embodiments of that variant may provide the ability to combine the signals from several or all of the PAS antenna elements such that the receiver processes the combined signal. Such combining may include circuitry to individually scale the amplitudes and phases of the signals picked up by the PAS antenna elements before or in the combining process. The scaling may be configurable per PAS antenna element for amplitude and/or phase. Particular embodiments of this method may use beamforming circuitry similar, at least in principle, to the beamformer elements used in the DUT. An example is shown in Figure R-C. Such beamforming circuitry may implement the amplitude and/or phase change using analog, digital, or hybrid techniques.

Some embodiments may implement the receiver system in a package separate from the PAS and with the two connected using cables, waveguides or other possibilities. An example is shown in Figure R-B. Other embodiments may integrate the receiver system with the PAS antenna elements more such that these parts form a single package. An example is shown in Figure R-C. It may also be beneficial to integrate a portion of the receiver system with the PAS only. E.g., in a multi-stage receiver design just the receiver parts processing signals at the higher frequencies may be integrated with the PAS and the processing stages for signals at lower frequencies may be a separate entity connected to the former using cables etc. An example is shown in Figure R-A.

Some embodiments may implement the processing of the raw output of the measurement receiver system on another processing element such as a computer system to which the receiver system is connected. Figures R-A to R-C illustrate this partitioning. Other embodiments may include at least some of the processing with the receiver system itself and may choose to implement the processing using dedicated circuitry.

Of course, an engineer skilled in the art will easily be able to design hybrid forms drawing on particular combinations of these basic methods. It is intended that all such embodiments are embraced by this disclosure and the claims made below.

PAS NF-FF Reconstruction Methodology

One aspect of the NF-FF reconstruction is to exploit the linearity between the NF and the FF. In the NF, the distribution of radiated field strength may depend on the distance while in the FF the beam pattern is independent on the distance except for an amplitude scaling factor inversely proportional to the distance. FIG. 5 is a schematic view depicting the NF and FF regions.

Figure 11:
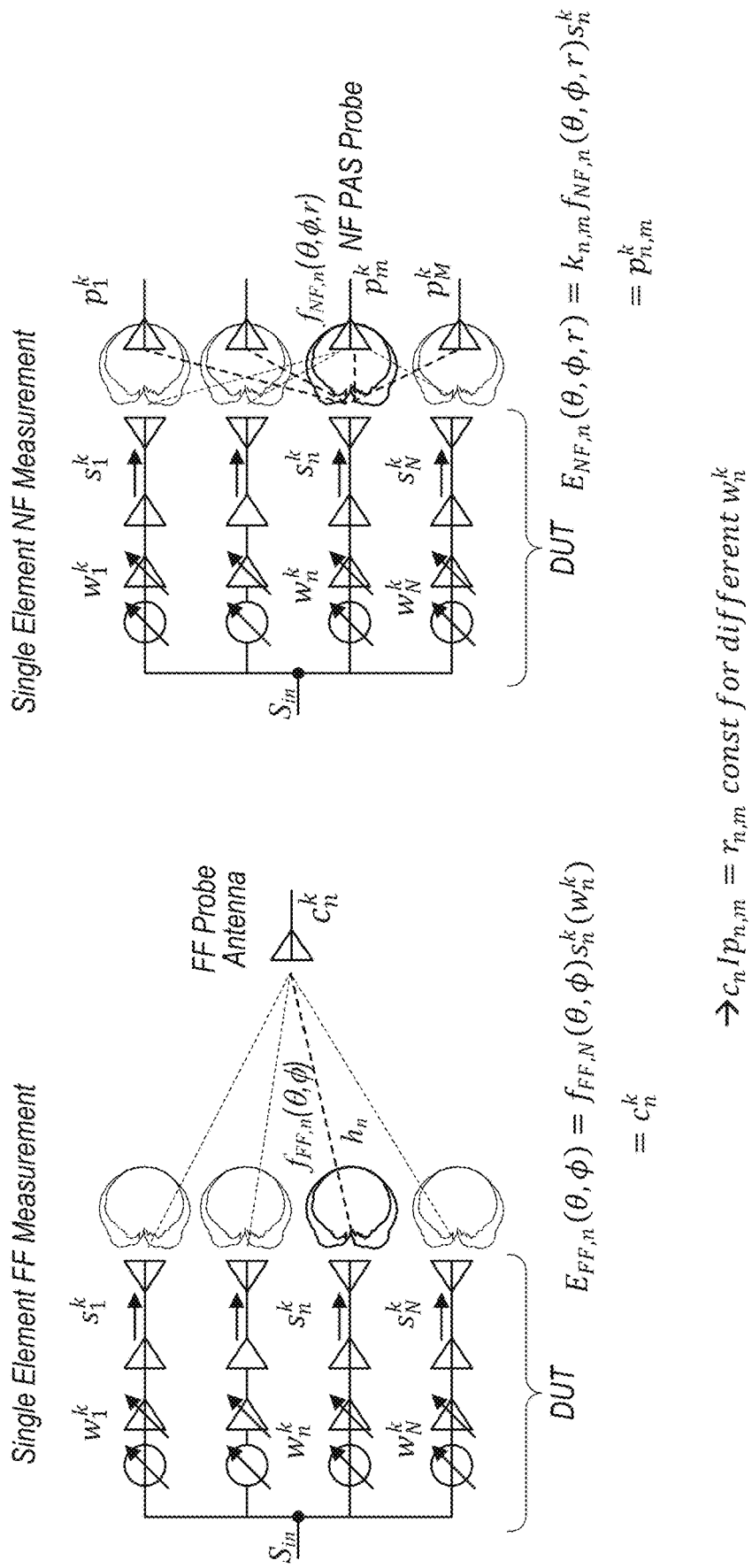
FIG. 11 illustrates the relation of far field (FF) and near field (NF) measurements, and more particularly shows that a measurement in the NF is proportional to a measurement in the FF for a given beamformer weight.

As shown in FIG. 11 a field strength-based measurement in the NF ($E_{NF}(w)$) is assumed to be proportional to a field strength-based measurement in the FF ($E_{FF}(w)$) for the same beamformer weights (w), DUT input signal and power ($s_{in}$), and other relevant operational parameters including temperature and humidity. The aforementioned conditions make the wireless signals generated by the DUT antenna elements (s(w)) the same for FF and NF measurements. As mentioned above, the field distribution in the NF $E_{NF,m}$ at a specific PAS antenna element (m, 1≤m≤M) at a position ($\theta_{NF,m}$, $\phi_{NF,m}$, $r_{NF,m}$) from the DUT may be different from the field pattern in the FF $E_{FF}(\theta, \phi)$. However, both depend on the same wireless signals generated by the DUT where the dependency takes the form of a linear relationship with the mapping on the FF side translating the wireless signals generated by the DUT antenna elements to their combined field-strength effect at various points (p, 1≤p≤P) in space (directions ($\theta_p$, $\phi_p$)) and with the mapping on the NF side translating the wireless signals generated by the DUT to their combined field-strength effects at the different PAS antenna elements. FIG. 11 illustrates that these linear mappings are independent of the exact parameters of DUT operation (especially, $s_{in}$ and w) and dependent only on fixed intrinsic characteristics of the DUT and PAS (captured by the DUT antenna elements' FF radiation characteristics, i.e., patterns of the individual single elements $f_{FF,n}(\theta, \phi)$, n, 1≤n≤N, and the DUT-to-PAS coupling coefficients $f_{NF,m,n}$) and the spatial arrangement of DUT and PAS with respect to each other (the latter affecting the couplings $f_{NF,m,n}$ through variations in the PAS position relative to the DUT ($\theta_{NF,m}$, $\phi_{NF,m}$, $r_{NF,m}$)). Thus, any change in the wireless signal generated by the DUT will be similarly measurable in the FF and the NF, and there will be constant proportional factors between the various FF and NF measurements.

The proportional factor for each combination of a FF measurement point (direction ($\theta_p$, $\phi_p$)) and a NF measurement point (PAS antenna element m) may be determined from processing a series of FF measurements and a series of NF measurements where both measurement series were taken using the same series of wireless signals generated by the DUT (a series of different values for s(w)). In the case where the number of PAS elements (M) equals the number of DUT antenna elements (N) it is sufficient to use N different wireless signals generated by the DUT. Some embodiments may simply vary the beamformer settings (w) to create the required different wireless signals generated by the DUT.

The aforementioned linear relationship between NF and FF measurements of field strength may apply to all wireless signals that the DUT may generate. In particular, for signals covering a larger frequency bandwidth, proportional factors relating NF and FF measurements can be found for each specific frequency in that bandwidth. The proportional factors for different such frequencies may be different. Some embodiments may choose to determine multiple sets of proportional factors corresponding to multiple frequencies of interest so as to process the measurement data dependent on frequency with the associated set of proportional factors and to produce a wideband characteristic of the wireless signal generated by the DUT based on the intermediate results of the frequency-dependent processing.

During calibration, reference DUT FF base functions and calibration coefficients may be determined using a reference DUT. In some embodiments, the calibration coefficients may also be referred to as reconstruction coefficients or a reconstruction matrix.

During measurement, the calibration coefficients may enable determination of DUT far field scaling factors which can be applied to the reference DUT FF base functions. This allows a correlation to be made between the reference DUT FF base functions and the probe-based field measurements so that it is possible from any probe-based field measurement for a beamformer setting to predict the FF pattern of the DUT.

The DUT far field scaling factors refer to the complex numbers used to scale the reference DUT FF base functions to predict the corresponding FF pattern.

The reference DUT FF base functions may refer to a set of N patterns, preferably FF patterns, which can be used to create any other FF pattern. When the reference DUT is driven by a beamformer setting, a FF pattern is established. Assume a reference DUT has N antenna elements of which the signals can be controlled in amplitude and phase. Here the degree of freedom to create any FF pattern is equal to the number of antenna elements×2 due to amplitude and phase control. This means that it is possible to create a series of N FF patterns (amplitude and phase) from which any other FF pattern for that reference DUT can be composed. These patterns are referred to as reference DUT FF base functions.

Ratios $r_{n,m}$ may be determined for every DUT-PAS element link so that a reconstruction matrix is produced as follows:

$$R = \begin{bmatrix} r_{1,1} & \cdots & r_{1,M} \\ \vdots & \ddots & \vdots \\ r_{N,1} & \cdots & r_{N,M} \end{bmatrix}$$

The reconstruction matrix R (the calibration coefficients) may be determined/estimated in a calibration step for one reference DUT. For DUTs of the same type the reconstruction matrix may be constant, which is important for the production test case. Therefore, once R is obtained the mapping may be calculated by computing the matrix-vector multiplication above. Due to the design rule of reducing cross-coupling between the different DUT-PAS links the matrix R is assumed to be diagonally dominated.

Using the reconstruction matrix R, the DUT FF scaling factors c may be determined from the plurality of probe-based field measurements p by $$\begin{bmatrix} c(1) \\ \vdots \\ c(N) \end{bmatrix} = R \begin{bmatrix} p(1) \\ \vdots \\ p(N) \end{bmatrix} \qquad (1)$$

If the DUT FF scaling factors c are calculated, by exploiting the superposition principle the single-element FF patterns sum up to the overall FF pattern as follows:

$$E(\theta) = \sum_{n=1}^{N} c(n) f_n(\theta)$$

In the calibration procedure used in some embodiments, for the FF and NF calibration measurements only one DUT antenna element is used while the others may be switched off or attenuated as much as possible. As indicated in FIG. 11, the neighboring antenna elements may cause interference when they cannot be sufficiently attenuated. Although cross-coupling is reduced through the PAS design, the interference can be strong enough to impact the FF and NF single antenna measurements negatively so that the calibration coefficients c may become erroneous. This has been experimentally proven. Those interference effects can be compensated for by measuring the interference caused by attenuated antennas and subtracting the interference from the measurement. Some embodiments may include algorithmic modifications to avoid the single antenna muting.

In some embodiments, the wireless signals generated by the DUT may occupy a wide bandwidth such that the FF patterns, i.e., the distribution of radiated power or, equivalently, of electric field strength in the space around the DUT varies with frequency across the occupied bandwidth. Some embodiments may determine a plurality of sets of calibration coefficients, reference DUT FF base functions, and DUT FF scaling factors or otherwise characterize the frequency dependency of the NF-to-FF mapping. Multiple techniques may be used to determine these quantities including frequency-swept analysis, evaluation of multi-tone stimuli, or estimation of the NF-FF impulse response. Some embodiments may use Fourier or other mathematical transform techniques to synthesize the wideband FF characteristics of the wireless signals generated by the DUT.

The phase measurements for determining the reference DUT FF base functions are understood to be relative to a common reference. In some embodiments the phase measurements may refer to measurement of an accessible signal of the beamformer of the DUT of the same frequency as the electromagnetic fields that are measured and which is the same for determining all the reference DUT FF base functions. Other embodiments may refer the phase measurements to the phase of the wireless signal generated by the DUT in a fixed location.

The phase measurements for determining a plurality of probe-based field measurements or the series of a plurality of probe-based field measurements of the wireless signals generated by the DUT are understood to be relative to a common reference. In some embodiments the phase measurements may refer to measurement of an accessible signal of the beamformer of the DUT of the same frequency as the electromagnetic fields that are measured and which is the same for determining all the reference DUT FF base functions. Other embodiments may refer the phase measurements to the phase of the wireless signal generated by the DUT in a fixed location.

The radiation of the wireless signals generated by the DUT may be single-polarized or dual-polarized. Some embodiments may determine calibration coefficients, reference DUT FF base functions, and DUT FF scaling factors for one polarization or per polarization to determine the FF pattern for one polarization or per polarization.

Figure 12:
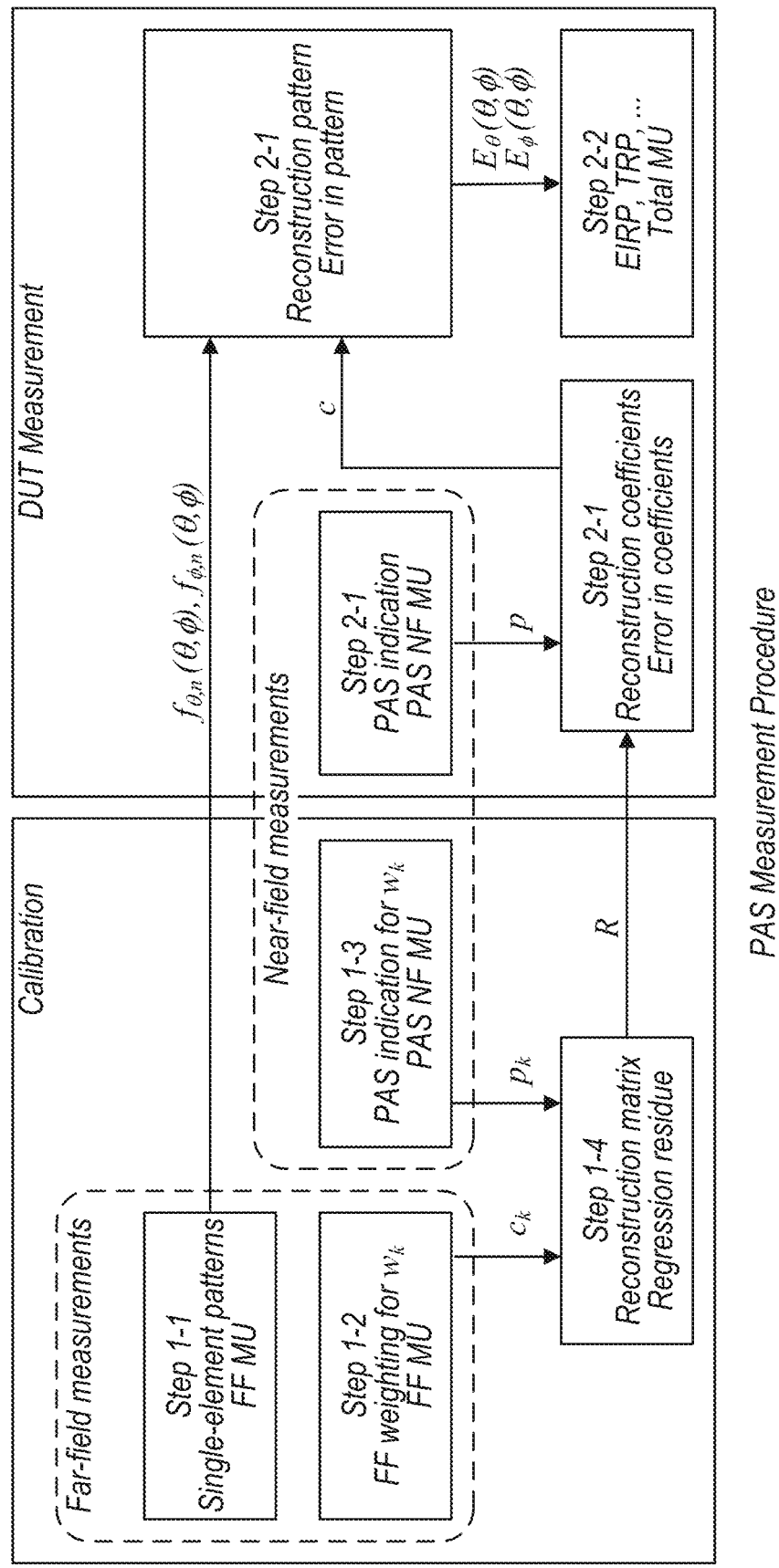
FIG. 12 illustrates a PAS measurement procedure, according to some embodiments.

FIG. 12—Reconstruction Algorithm

FIG. 12 is a flow diagram that illustrates one embodiment of the calibration and measurement task. As shown, the method includes a calibration procedure shown on the left-hand side of FIG. 12 that is performed first on a reference DUT, and the method also includes a DUT measurement procedure shown on the right-hand side of FIG. 12. Thus, the procedure for determining the far-field characteristics of a phased-array DUT from near-field indications with a probe antenna array (the PAS) includes a calibration stage followed by the actual measurement stage.

In the calibration stage, the relationship between near-field PAS indications and the DUT's far-field E-field pattern is established by quantifying two items: the single-element far-field patterns for a subset or all reference DUT elements (reference DUT FF base functions) and calibration coefficients (also called a reconstruction matrix). These items are quantified using measurements on a known, good device called the reference DUT. Thus, the calibration stage involves multiple far-field and near-field measurements on a reference DUT, resulting in single-element far-field patterns (reference DUT FF base functions) and calibration coefficients (reconstruction matrix).

During calibration, the reference DUT may be placed in a plurality of beamformer settings, and measurements may be taken. For example, one or more beamforming chips may be connected to the antenna panels in the reference DUT. The one or more beamforming chips may be driven by a signal, either RF, IF or even baseband. These chips have the ability to control the signal power and signal phase of each signal going internally to each antenna panel. The beamformer setting refers to a collection of amplitude and phase settings resulting in a certain beam when a signal is applied to the beamforming chip.

The DUT measurement stage involves the translation of near-field indications from the PAS into far-field characteristics using the single-element far-field patterns (reference DUT base functions) and the calibration coefficients (reconstruction matrix). Stated another way, the single-element far-field patterns and the reconstruction matrix are applied in subsequent measurements on a series of DUTs, preferably of the same design as the reference DUT. The measurements may be based on, e.g., continuous wave single-tone, multi-tone or other wider-bandwidth modulated stimuli.

As shown in FIG. 12, the calibration step may include sub-steps 1-1, 1-2, 1-3, and 1-4, and these steps are described in greater detail below. As also shown in FIG. 12, the DUT measurement step may include sub-steps 2-1 and 2-2, and these steps are also described in greater detail below.

Stage 1: Calibration

As noted above, calibration may be performed using a known, good device called the reference DUT.

DUTs may operate differently and some embodiments may apply the general algorithm in ways adapted to specific DUT designs. Herein, two different DUT element control types are considered as examples. Control type 0 refers to a DUT wherein radiation from each individual element may be shut off completely. Control type ATT refers to a DUT wherein attenuation may be set for each element individually, wherein radiation from each element may not be shut off completely.

The following is an example method for measuring single-element far-field patterns as part of the calibration step.

Step 1-1: Procedure for Measuring Single-element Far-Field Patterns (Reference DUT Base Functions)

The following steps may be undertaken to measure the single-element far-field (E-field) patterns (amplitude and phase) $f_{\theta,n}(\theta,\phi)$ and $f_{\phi,n}(\theta,\phi)$ for all the reference DUT array's elements (n). For DUTs with control type ATT: Far-field interference patterns (amplitude and phase) $f_{\theta,int}(\theta,\phi)$ and $f_{\phi,int}(\theta,\phi)$. Far-field interference patterns may occur when, for example, a DUT is driving a single antenna element, and the other antennas are still radiating and thus creating interference with the electromagnetic signals being generated by the single antenna element being driven.

A. Mount reference DUT into far-field measurement system

B. For each polarization $\gamma \in \{\theta,\phi\}$

C. Align probe's polarization plane with polarization $\gamma$

D. For each direction $(\theta,\phi)$ from the spatial sampling grid

E. For control type ATT: Set DUT elements to minimum possible radiation:

$$w_y^{off} = [w_y^{off}(1), \ldots, w_y^{off}(N)]^T$$

F. For control type ATT: Measure far-field E-field amplitude and phase, record results as the far-field interference pattern for polarization $\gamma$ $$f_{\gamma,int}(\theta,\phi) = b_\gamma(\theta,\phi)|_{w=w_y^{off}}$$

G. For each DUT element n, n=1, ...,

H. Configure DUT to (predominantly) radiate from element n $$\hat{w}_\gamma(n) = [w_y^{off}(1), \ldots, w_y^{off}(n-1),$$

$$\tilde{w}(n), w_y^{off}(n+1), \ldots, w_y^{off}(N)]^T$$

I. Measure far-field E-field amplitude and phase, for control type ATT: subtract far-field interference pattern, record results as the far-field pattern for element n and polarization $\gamma$ $$f_{\gamma,n}(\theta,\phi) = \begin{cases} b_\gamma(\theta,\phi)|_{w=\hat{w}_\gamma(n)} - f_{\gamma,int}(\theta,\phi) & \text{control type } ATT \\ b_\gamma(\theta,\phi)|_{w=\hat{w}_\gamma(n)} & \text{control type } 0 \end{cases}$$

J. Upon completion of Step 1-1, continue with Step 1-2.

In step B, if a single polarization plane is of interest only, e.g., because the DUT is single-polarized, measurements may only be performed for this polarization. Polarizations may be measured in parallel using a single spatial sweep with a dual-polarized probe antenna. In such a case it may be ensured that $$w_\theta^{off}(n) = w_\phi^{off}(n).$$

In step E, in case of high losses in the far field system and/or low output power, a fixed, not minimal setting may be beneficial to increase the signal-to-noise ratio of the measurement.

In step H, $\hat{w}(n)$ may be the amplitude and phase setting for the radiating element n. Choosing a large amplitude (corresponding to large radiated power) may increase measurement sensitivity.

In steps E and H, $w_\theta^{off}(n)$ may be the amplitude and phase setting causing "minimum possible radiation" from element n. For control type ATT, it may typically correspond to minimum amplitude settings with some freedom to choose phase settings to minimize overall uncertainty. For control type 0 it may be the setting that completely shuts off radiation from element n.

In steps E, F and I, "minimum possible radiation" may be DUT dependent. For DUT designs implementing control type 0, "minimum possible radiation" may mean "no radiation".

Step 1-2: Procedure for Measuring Far Field Reconstruction Coefficients (Calibration Coefficients)

The following steps may be performed to measure the far-field reconstruction coefficients (amplitude and phase) $c_k$ for all the reference DUT array's elements for K beamformer settings $w_k$.

K. Mount reference DUT into far-field measurement system

L. Tune the measurement system to measure the far-field E-field at a single fixed direction $(\theta_0,\phi_0)$ and with probe aligned with one polarization $\gamma \in \{\theta,\phi\}$ M. Select number of measurements to perform, $K \geq K_{min}$, where $$K_{min} = \begin{cases} 2N & \text{control type } ATT \\ N & \text{control type } 0 \end{cases}$$

N. Select K beamformer settings $w_k$, k=1, ..., such that some DUT array element $n_k$, $n_k$=1, ..., N, predominantly radiates, i.e., choose an amplitude and phase setting $w_k(n_k)$; and such that other elements $m \neq n_k$ radiate minimally:

$$w_k(m) = w_y^{off}(m);$$

and such that $w_k$ is sufficiently different from all other settings $w_l$, $l \neq k$ O. For each beamformer setting $w_k$, k=1, ... K, P. Configure the DUT elements with beamformer settings $w_k$ Q. Measure far-field E-field amplitude and phase, for control type ATT:

subtract far-field interference level at direction $(\theta_0,\phi_0)$, normalize to the pattern value of DUT element $n_k$ at direction $(\theta_0,\phi_0)$, record result as the far-field reconstruction coefficient $c_k(n_k)$ $$c_k(n_k) = \begin{cases} \dfrac{b\gamma(\theta 0, \phi 0)|w = wk - f\gamma, int(\theta 0, \phi 0)}{f\gamma, nk(\theta 0, \phi 0)} & \text{control type } ATT \\ \dfrac{b\gamma(\theta 0, \phi 0)|w = wk}{f\gamma, nk(\theta 0, \phi 0)} & \text{control type } 0 \end{cases}$$

R. Upon completion of Step 1-2, continue with Step 1-3.

With respect to step K, using the same far-field measurement setup for measuring far-field reconstruction coefficients as used in measuring single element far-field patterns may leave measurement distance, transmission line mismatches, and positional offsets, etc. unchanged. Therefore, the results from both procedures may share the same reference which may simplify post-processing. Also, the effect of some measurement uncertainty sources present in both steps may cancel out.

In step L, direction $(\theta_{0,0})$ may be selected to optimize measurement sensitivity such that radiation from each of the elements may be measured with negligible noise.

In step M, $K_{min}$ is the number of unknowns that may be solved for in the procedure to determine the reconstruction matrix in Step 1-4.

In step N, $w_k(n_k)$ is the amplitude and phase setting for the radiating element $n_k$. Choosing large amplitudes (corresponding to large radiated power) may increase measurement sensitivity. The same $w_y^{off}(m)$ values that were used in step 1-1/E may be applied. "Sufficiently different" means that the minimization problem to be solved in step 1-4 is numerically stable.

In step Q, interference pattern $f_{\gamma,int}(\theta,\phi)$ may be from step 1-1/F, based on $w = w_\gamma^{off}$ Single-element pattern value $f_{\gamma,k}(\theta_0, \phi_0)$ may be from step 1-1/I, based on $w = \hat{w}_\gamma(n)$.

Step 1-3: Procedure for Measuring Near-Field PAS Responses

The following steps may be undertaken to measure the near-field PAS responses (amplitude and phase) $p_k$ for all the reference DUT's array's elements for K beamformer settings $w_k$. Here the method obtains a series of a plurality of probe-based field measurements of the wireless signals generated by the reference DUT.

S. Mount reference DUT into near-field PAS measurement setup

T. Let DUT and measurement instrumentation reach a stable operating temperature

U. For each of the beamformer settings $w_k$, $k=1, \ldots, K$, selected in step 1-2/N:

V. For control type ATT: Set DUT elements to reduced radiation $$w_\gamma^{off} = [w_\gamma^{off}(1), \ldots, w_\gamma^{off}(N)]^T$$

W. For control type ATT: Measure near-field PAS responses of all N PAS elements, record results as the near-field interference indications vector $$p_k^{int} = [p_k^{int}(1), \ldots, p_k^{int}(N)]^T$$

X. Configure the DUT elements with beamformer settings $w_k$

Y. Measure near-field PAS responses of all N PAS elements, record results in the raw near-field PAS indications vector $$\tilde{p}_k = [\tilde{p}_k(1), \ldots, \tilde{p}_k(N)]^T$$

and record as the final near-field PAS indications vector $$p_k = [p_k(1), \ldots, p_k(N)]^T = \begin{cases} \tilde{p}_k - p_k^{int} & \text{control type } ATT \\ \tilde{p}_k & \text{control type } 0 \end{cases}$$

Z. Upon completion of Step 1-3, continue with Step 1-4.

Step 1-4: Procedure for Determining the Reconstruction Matrix:

The following steps may be undertaken to determine reconstruction matrix R and regression residue $\varepsilon$. Here the method obtains calibration coefficients in the form of a reconstruction matrix.

To find the reconstruction matrix, solve the minimization problem $$R = \arg\min_{\tilde{R},\{c_{off}(m)\}} \varepsilon(\tilde{R}, \{c_{off}(m)\})$$

where the function to be minimized is called the regression residue and is given by $$\varepsilon(\tilde{R}, \{c_{off}(m)\}) = \frac{1}{NK}\|C - \tilde{R}P\|_F^2 = \frac{1}{NK}\sum_{i=1}^{N}\sum_{j=1}^{K}|(C - \tilde{R}P)_{ij}|^2$$

If $\varepsilon(R, \{c_{off}(m)\}) \leq \varepsilon_{max}$, consider the calibration to be successful and continue with DUT measurements in stage 2. Otherwise, consider the calibration to have failed.

In step X, embodiments may use any of a range of numerical method including matrix inverse, matrix pseudo inverse, least squares, singular value decomposition, simulated annealing, differential evolution, and others. For example, for the general case of $K \geq N$, an embodiment may find the reconstruction matrix from C and the pseudo inverse of P as $R = CP^H(PP^H)^{-1}$.

In step X, $\{c_{off}(m)\}$ may represent the far-field responses of the reference DUT's elements if deactivated or set to minimum radiation and may partly populate matrix C. For control level ATT: $\{c_{off}(m)\}$ are N additional unknowns. For control level 0: $c_{off}(m) = 0$ for all elements m.

In step X, $C = [c_1, \ldots, c_K]$ is an N×K matrix of the far-field responses with $c$, given by $$c_k = \begin{cases} [c_{off}(1), \ldots, c_{off}(n_k - 1), \\ c_k(n_k), c_{off}(n_k + 1), \ldots, c_{off}(N)]^T & \text{control type } ATT \\ [0, \ldots, 0, c_k(n_k), 0, \ldots, 0]^T & \text{control type } 0 \end{cases}$$

with $c_k(n_k)$ from step 1-2/Q and $\{c_{off}(m)\}$ defined as above.

In step X, $P = [p_1, \ldots, p^K]$ is an N×K matrix of the near-field responses with $p_k$ from step 1-3/V.

The correlation between $\{c_{k,k}\}$ and $\{c_l,p_l\}$, $k \neq l$, may be low to ensure numerical stability of the minimization problem.

Choosing the limit $\varepsilon_{max}$ to optimize calibration vs. DUT measurement uncertainty may be beneficial. An example of such a limit may be $\varepsilon_{max} = 0.05$ to reflect that a relative error of no more than 5% per DUT/PAS element may be targeted.

Stage 2: DUT Measurement

A series of DUTs of the same design as the reference DUT may be measured. In step 2-1, the relationship established in the calibration stage to determine the DUT's beam pattern from near-field indications from the PAS may be used. Other interesting quantities may be derived in step 2-2

Step 2-1: Procedure to Reconstruct Far-Field Beam Pattern for DUT

The following steps may be undertaken to determine a DUT array's (beam) far-field patterns (amplitude and phase) $E_\theta(\theta,\phi)$ and $E_\phi(\theta,\phi)$.

Z. Mount DUT into near-field PAS measurement configuration

AA. Configure the DUT elements with some beamformer settings w.

BB. Read near-field responses from all N PAS elements, record in vector p. Here the method takes a plurality of probe-based field measurements of the wireless signals generated by the DUT.

CC. Compute DUT FF scaling factors $c = Rp$. Here the method computes a set of FF scaling factors, using the plurality of probe-based field measurements and a set of calibration coefficients. In some embodiments, a quantity of the set of FF scaling factors is equal to a quantity of a set of reference DUT FF base functions.

DD. Compute FF (far-field) beam patterns:

$$E_\theta(\theta,\phi)|_w = \Sigma_{n=1}^N c(n) f\theta, n(\theta,\phi) + f\theta, \text{int}(\theta,\phi) \text{ and}$$

$$E_\phi(\theta,\phi)|_w = \Sigma_{n=1}^N c(n) f\theta, n(\theta,\phi) + f\theta, \text{int}(\theta,\phi) \text{ and}$$

Thus in step DD the method determines the FF pattern of wireless signals of the DUT based on the DUT FF scaling factors and the set of reference DUT base functions.

In step Z, the DUT may be positioned relative to the PAS in the same way that the reference DUT was positioned relative to the PAS during calibration. In step CC, the reconstruction matrix determined in step 1-4 may be used. In step DD, the single-element far-field patterns measured in step 1-1 may be used.

Step 2-2: Procedure for Deriving Other Far-field Quantities

The following steps may be undertaken to measure the E-field total far field magnitude in Volts per meter (V/m); the Effective Isotropic Radiated Power (EIRP) in Watts (W); the Effective Isotropic Radiated Power (EIRP) in decibel-milliwatts (dBm); the Total Radiated Power (TRP) in Watts (W); the Total Radiated Power in decibel-milliwatts (dBm) and the Directivity (D) in decibel isotropic (dBi).

Step 1-1a: Procedure for Measuring Reference DUT Base Functions to Reconstruct Far-Field Patterns The following steps may be undertaken to measure the far-field (E-field) patterns (both amplitude and phase) $f_{\theta,w}(\theta,\phi)$ and $f_{\phi,w}(\theta,\phi)$ created by all the reference DUT array's elements (n) for a given beamformer setting (w) and for both polarizations $\gamma \in \{\theta,\phi\}$. The far-field patterns may also include additional radiating parts of the DUT not directly controllable by the given beamformer setting. For example, other components of the DUT may emit thermal or other types of radiation.

In some embodiments, a set of beamformer setting vectors ($w_i$) are determined that result in an orthogonal basis of far field (E-field) patterns (amplitude and phase) $f_{\theta,w}(\theta,\phi)$

| Quantity | Unit | Equation |
|---|---|---|
| E-field total far-field | V/m | $\|E(\theta,\phi)\| = \sqrt{\|E_\theta(\theta,\phi)\|^2 + \|E_\phi(\theta,\phi)\|^2}$ referred to reference distance $r_0$ (property of the far-field measurement system, typically $r_0 = 1$ m) |
| EIRP | W | $EIRP(\theta,\phi) = \begin{cases} 2\pi r_0^2 \dfrac{\|E(\theta,\phi)\|^2}{\eta} & E(\cdot) \text{ refers to peak values} \\ 4\pi r_0^2 \dfrac{\|E(\theta,\phi)\|^2}{\eta} & E(\cdot) \text{ refers to effective values} \end{cases}$ |
| EIRP | dBm | $\eta = 120\pi\Omega \approx 377\,\Omega$ is the intrinsic impedance of free space $EIRP_{dBm}(\theta,\phi) = 10 \cdot \log_{10}(EIRP(\theta,\phi)))dBm + 30\,dB$ $EIRP_{dBm}(\theta,\phi) = \begin{cases} 20 \cdot \log_{10}\left(\dfrac{\|E(\theta,\phi)\|}{Vm^{-1}}\right) + 20 \cdot \log_{10}\left(\dfrac{r_0}{m}\right) + 10 \cdot \log_{10}\left(\dfrac{1000}{60}\right) & E(\cdot) \text{ refers to peak values} \\ 20 \cdot \log_{10}\left(\dfrac{\|E(\theta,\phi)\|}{Vm^{-1}}\right) + 20 \cdot \log_{10}\left(\dfrac{r_0}{m}\right) + 10 \cdot \log_{10}\left(\dfrac{1000}{30}\right) & E(\cdot) \text{ refers to effective values} \end{cases}$ |
| TRP | W | $TRP(\theta,\phi) = \dfrac{1}{4\pi}\int_0^{2\pi}\int_0^{\pi} EIRP(\theta,\phi)\sin(\theta)d\theta d\phi$ |
| TRP | dBm | $TRP_{dBm} = 10 \cdot \log_{10}(TRP)dBm + 30\,dB$ |
| Directivity | dBi | $D(\theta,\phi) = EIRP_{dBm}(\theta,\phi) - TRP_{dBm}$ |

Alternative Method for Reconstructing DUT FF Signals without Interference Mitigation The embodiments described above in reference to steps 1-1 through 2-2 describe a process for reconstructing an FF DUT signal that includes steps to subtract interference contributions between different antenna elements of the DUT. The method steps described above attempt to isolate signals for each DUT antenna, but it may be practically difficult to perfectly isolate each antenna. This may lead to some interference between the antennas when, e.g., measuring the reference DUT base functions, and this interference is subsequently subtracted, as described above.

In another embodiment, an orthogonal set of beamformer weights may be utilized to obviate the reasons for performing this interference subtraction. This method is described in detail below in reference to steps 1-1a through 2-1a. This alternative method is described to highlight differences between it and methods that perform interference subtraction. Accordingly, for ease of exposition, some of the details of the methods described below are omitted, as they are described in sufficient detail above. In other words, the methods described in reference to steps 1-1a through 2-1a may be combined with relevant aspects described in steps 1-1 through 2-2, which include this additional detail.

The method steps described below are in reference to reconstructing a FF beam pattern for a DUT based on NF measurements. However, the described method may also be used to reconstruct the FF beam pattern based on FF measurements, as desired.

and $f_{\phi,w}(\theta,\phi)$. Each beamformer setting vector w includes an element in the vector for each of the antenna elements of the DUT. For example, the methods described above in reference to steps 1-1 through 2-2 utilize a set of beamformer setting vectors where each setting turns on the radiation of one DUT antenna element and minimizes or turns off the radiation of all other elements. More generally, the set of beamformer settings may be selected such that the set of beamformer setting vectors spans the vector space of the sets of beamformer settings. In other words, the set of beamformer setting vectors may be selected such that any arbitrary beamformer setting vector may be constructed with a linear combination of the set of beamformer setting vectors. Advantageously, this may be accomplished without setting the radiation of any DUT element to zero (which may be practically difficult to achieve), and may remove interference introduced from imperfectly disabled antenna elements. Accordingly, an accurate FF beam pattern may be reconstructed without performing interference subtraction. In other words, each of the beamformer vectors w may include an appreciable amplitude for each of the DUT antenna elements, and at least a subset of the beamformer setting vectors may be mutually orthogonal such a linear combination of the beamformer setting vectors may be used to obtain any desired beamformer setting vector. To accomplish this, the number of beamformer settings may be at least equal to (or potentially larger than) the number of antenna elements on the DUT.

In some embodiments, the reference DUT may be mounted into a far-field measurement system. The far-field measurement system may include the mounted reference DUT and a far-field measurement probe. The reference DUT and measurement instrumentation are allowed reach a state of stable operation. For example, they may be allowed to rest to obtain a stable operating temperature, among other possibilities.

In some embodiments, for each polarization $\gamma \in \{\theta, \phi\}$, the far field probe's polarization plane is aligned with polarization $\gamma$ of the DUT. This may be performed by physically rotating the DUT or the FF probe by 90°, and/or it may be performed through software (i.e., by causing the circuitry of the DUT and/or the FF probe to alter the polarization of transmission and/or reception, respectively). For each beamformer setting of the set of orthogonal beamformer settings ($w_i$), and for each direction ($\theta, \phi$) from the spatial sampling grid, the far field pattern $f_{\gamma, i}(\theta, \phi)$ corresponding to one of the orthogonal beamforming settings is measured.

Note that the order of operations for cycling polarization and beamformer settings may proceed in either order, according to convenience and the configuration of the DUT and/or the FF probe. For example, the entire set of beamformer settings may be measured for a first polarization before realigning to the second polarization and measuring the set of beamformer settings. Alternatively, both polarizations may be measured for each beamformer setting before proceeding to the next beamformer setting, as desired.

Step 1-2a: Procedure for Measuring Far-Field Reconstruction Coefficients (Calibration Coefficients)

The following steps may be performed to determine the far field reconstruction coefficient matrix R, utilized during measurement to determine the far-field scaling factors (amplitude and phase) $c_k$ for each of the reference DUT base functions, each corresponding to one of the orthogonal beamformer settings $w_k$. The matrix R may have a row corresponding to each of the beamformer settings in the set of beamformer settings ($w_i$) and a column corresponding to each of the probe antenna elements of the PAS (alternatively, the rows and columns may be switched, as desired).

In some embodiments, the reference DUT may mounted into a near-field PAS measurement setup. The reference DUT may be mounted such that it is configured to radiate toward a probe antenna system (PAS). The PAS may have at least the same number of probes as the number of antenna elements of the DUT. The reference DUT and measurement instrumentation may be allowed to reach a state of stable operations, e.g., a stable operating temperature, among other possibilities.

In some embodiments, for each polarization $\gamma \in \{\theta, \phi\}$, the reference DUT and the PAS may be aligned for the PAS to receive radiation from the reference DUT with polarization $\gamma$, and the $\tilde{p}_k$ measurements may be repeated for each of the two polarizations. For each beamformer setting ($w_i$) used during the far-field characterization at step 1-2a, near-field PAS responses are measured for each probe element of the PAS, and results are recorded in the raw near-field PAS indications vector, where the subscript k indicates a particular beamformer setting $w_k$:

$$\tilde{p}_k = [\tilde{p}_k(1), \ldots, \tilde{p}_k(N)]^T$$

The combination of the $\tilde{p}_k$ for each beamformer setting $w_k$ comprises the R matrix.

In some embodiments, in obtaining the near-field PAS indications vectors $\tilde{p}_k$, the same input power for the DUT may be utilized as was used in measuring the reference DUT base functions, enabling absolute far-field reconstruction for arbitrary power and avoiding beamformer characteristics that scale with input power from adversely affecting the accuracy of the reconstruction. Advantageously, an arbitrary input power may be used in step 2-1a to reconstruct the FF pattern a DUT once the R matrix is obtained.

Step 2-1a: Procedure to Reconstruct Far-Field Beam Pattern for DUT

The following steps may be undertaken to determine a DUT array's far-field beam patterns (amplitude and phase) $E_\theta(\theta, \phi)$ and $E_\phi(\theta, \phi)$ for any arbitrary beamforming setting w, based on a near-field PAS measurement.

In some embodiments, the DUT is mounted into a near-field PAS measurement configuration in the same way that the reference DUT was positioned relative to the PAS during calibration at step 1-2a. The DUT antenna elements are configured with a beamformer setting w.

In some embodiments, near-field responses are read from all probe-based elements of the PAS, and are recorded in a vector p. Here the method takes a plurality of probe-based field measurements of the wireless signals generated by the DUT. For example, each antenna element of the DUT transmits a respective signal according to the configured beamformer setting w, and each probe element of the PAS receives a respective signal produced by the set of DUT antenna elements, as shown in FIG. 8.

In some embodiments, the DUT FF scaling factors c=Rp are computed. Here the method computes a set of FF scaling factors, using the plurality of probe-based field measurements and a set of calibration coefficients. The quantity of the set of FF scaling factors is equal to the quantity of the set of reference DUT FF base functions.

In some embodiments, the FF (far-field) beam patterns are computed according to the following equations:

$$E_\theta(\theta, \phi)|_w = \Sigma_{i=1}^M c(i) f_{\theta, i}(\theta, \phi))$$

$$E_\phi(\theta, \phi)|_w = \Sigma_{i=1}^M c(i) f_{\theta, i}(\theta, \phi))$$

where the index i is summed over each of the M beamformer settings of the set of beamformer settings ($w_i$) used to measure the reference DUT base functions (note that M may be equal to or greater than the number of antenna elements of the DUT, N), the $\{\theta, \phi\}$ subscripts refer to the polarization of the electric field, and the function arguments ($\theta, \phi$) designate the angular location of the reconstructed far-field beam pattern.

Determining Phase Reference for DUT Signals

When a signal is received from a DUT (either by an FF probe or a PAS), phase information of the received signal is recorded in addition to amplitude information. Typically, this phase information is compared to a reference phase to provide a coherent reference point for the phase information. In some embodiments, the DUT may receive input signals to stimulate transmission that have the same frequency as the emitted DUT transmissions. In these embodiments, the phase of these input signals may serve as the reference phase. For example, the phase of electromagnetic fields of the received reference DUT FF pattern (or alternatively, of the received plurality of probe-based field measurements) may be referred to an accessible signal of the beamformer of the same frequency. This reference phase may be the same for determining all the reference DUT FF base functions.

Alternatively, in some embodiments the DUT may receive a baseband or intermediate frequency input signal that is upconverted to produce a radio-frequency transmission. In this case, an input signal with the same frequency as the output transmission may not be accessible to obtain a reference phase. To address this issue, a reference phase may be obtained by a reference probe at a fixed location which also receives the transmissions from the DUT. For far-field transmissions, a fixed reference probe may be used while the FF signal is measured. For the measurements with the PAS, one of the antenna elements of the PAS may be used as a reference to obtain the reference phase while the other antenna elements are measured.

System for Measuring Far-Field Patterns

In order to measure the single-element far field patterns for all DUT elements, an appropriate system is configured.

The reference antenna may be used for receiving the radiated signals from the DUT in the far field and for measuring the single element radiation pattern (in the far or near field and with optional near-to-far field transformation).

Some embodiments may use an additional amplifier after the probe antenna to compensate for power loss between the DUT and the probe antenna as well as in the potentially long cables and other connectorized equipment and, thus, may improve the signal-to-noise ratio of the measurement.

DUT array beamformer settings may be chosen to cover, per DUT antenna element, all phase settings from 0° to 360° (or a subset thereof as appropriate for the DUT and the desired FF characteristics to be measured. In some embodiments beamformer settings may be chosen to result in high output power per DUT antenna element to ensure low noise related measurement errors.

In some embodiments, interference from other than the target DUT antenna elements may be compensated for in the measurements of the target DUT antenna elements. The beamformer settings for such other elements ("off" elements) may be chosen to result in low output power from such elements to minimize the interference impact on the measurements. In some embodiments, either additionally or alternatively, the phase settings for the DUT antenna elements may be chosen to improve the quality of the interference compensation. For example, the phase settings for the "off" elements may be such that the power level of the combined interference is large enough to make a good measurement of the interference effect itself. In another example, the phase settings for the "off" elements may be such that the interference is "steered away" from the measurement probe to reduce the impact of the interference on the measurement of the target elements. In some embodiments the choice of beamformer settings for the "off" elements may be based (additionally or alternatively) on further constraints such as possible DUT operating modes, DUT input and antenna impedance variations and other factors.

The FF pattern measurement may be taken using any of various techniques and all data may be the normalized electric field strength at a 1 meter distance.

System for Measuring Near-Field Radiation on DUT

One or multiple phase-aligned VNA may be used to measure the near-field radiation on the DUT. The test ports of the VNA may be connected to the plurality of antenna probes on the PAS. Specifically, some embodiments may measure the amplitudes and phases of the signals received on some or all of the test ports of the VNA that can be calibrated such that they reflect the amplitudes and phases of the wireless signals generated by the DUT.

A signal driving the DUT input ($s_{in}$ in FIG. 11) may be taken from the VNA. Some embodiments may open the source loop on one of the VNA test ports, may feed the source signal to the DUT input, may properly terminate the open connection to the directional coupler (typically, with a 50 Ohm load), and/or may use the VNA test port's receiver to perform measurements on one of the PAS antenna elements.

The same $w_k$ vector, i.e., beamformer settings, as in the FF measurements configuration may be used.

The DUT input power may be equal to or different from the far field configuration which may have no influence on the reconstruction algorithm as the normalization may remove any absolute power relation.

Some embodiments may choose to not calibrate the VNA if the same setup and VNA is used for the calibration as well as the reconstruction measurements.

Figure 13:
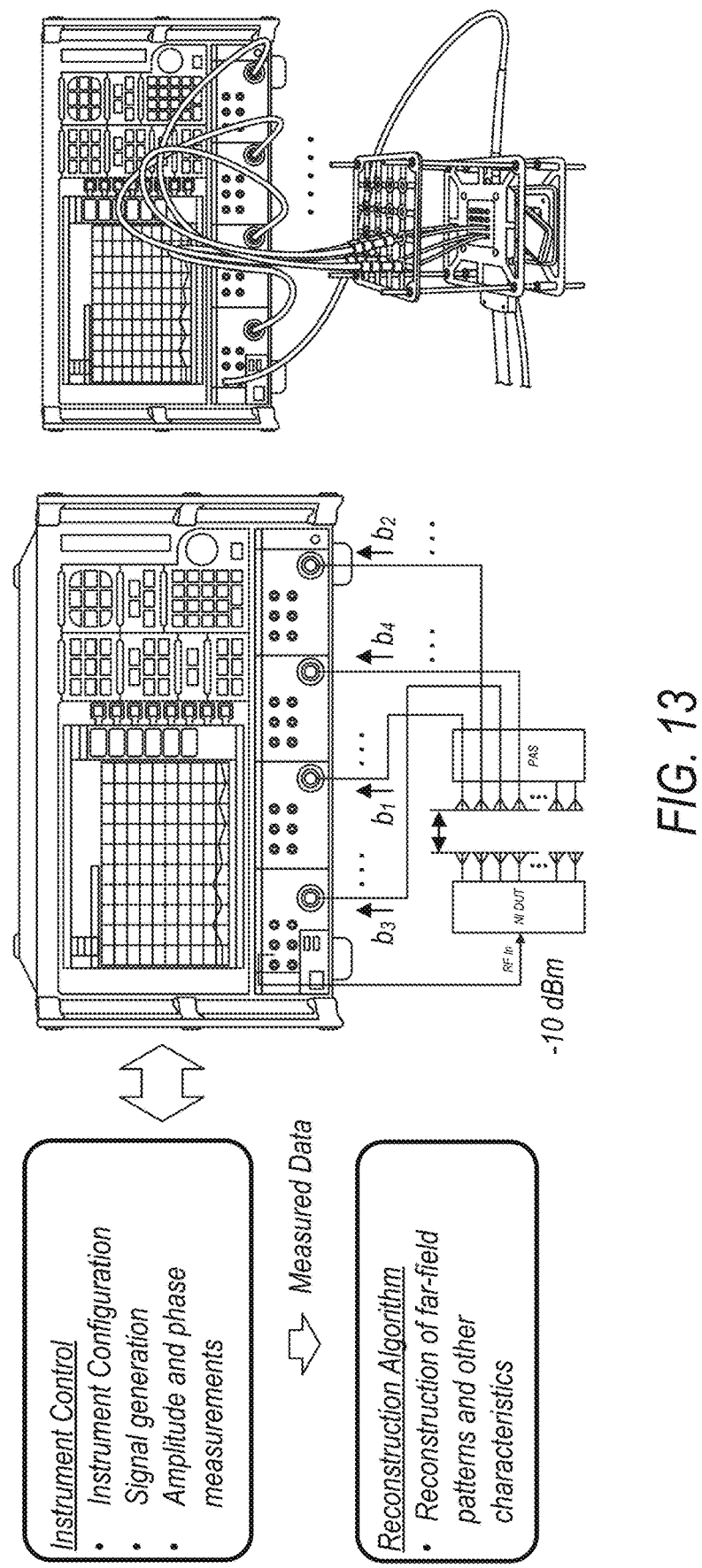
FIG. 13 illustrates a Vector Network Analyzer (VNA) based PAS measurement system for validating the NF-FF reconstruction procedure, according to some embodiments.

FIG. 13 illustrates a VNA-based PAS measurement system for validating the NF-FF reconstruction procedure. For the experimental validation, an 4×4 antenna array DUT prototype was used. The PAS-DUT fixturing is shown on the right-hand side in the figure. As the VNA used in the validation only provided four separate ports for measurement, and thus the validation shows results for a 2×2 subarray of the antenna array DUT.

Figures 14A, 14B:
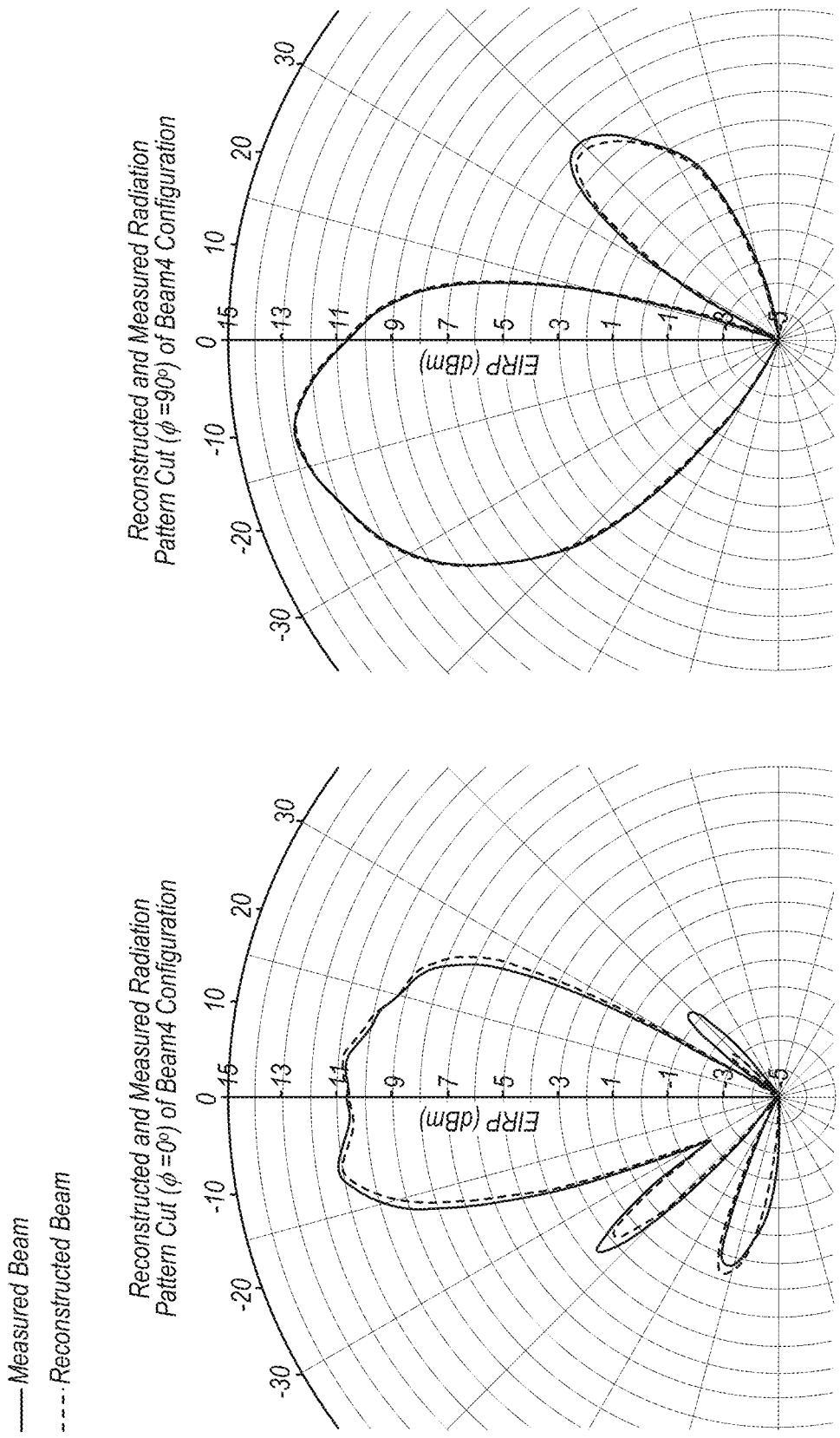
FIGS. 14A-B illustrate example comparisons of NF reconstructed FF patterns and the corresponding measured FF patterns, according to some embodiments.

FIGS. 14A-B show results in terms of beam patterns. The solid line curves represent the FF reference measurement for one specific beam configuration (beamformer setting). The dashed line curves show the reconstructed FF pattern based on the NF PAS measurement applying the NF-FF reconstruction procedure described above.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for determining a far-field (FF) pattern of wireless signals generated by a device under test (DUT), wherein the DUT includes an antenna array comprising a plurality of DUT antenna elements, the method comprising:
   obtaining a plurality of probe-based field measurements of the wireless signals generated by the DUT;
   computing a set of FF scaling factors, using the plurality of probe-based field measurements and a set of calibration coefficients, a quantity of the set of FF scaling factors being equal to a quantity of a set of reference DUT FF base functions;
   determining the FF pattern of wireless signals based on the FF scaling factors and the set of reference DUT FF base functions;
   wherein the FF pattern of wireless signals generated by the DUT is useable to assess operation of the DUT in the FF.

2. The method of claim 1,
   wherein the obtaining is performed by a probe antenna system (PAS) having a plurality of PAS antenna elements, wherein the plurality of PAS elements is equal to or greater than the plurality of DUT antenna elements.

3. The method of claim 1,
   wherein obtaining the plurality of field measurements of the wireless signals generated by the DUT comprises:
   configuring the plurality of antenna elements of the DUT with certain beamformer settings while driving a beamformer with a signal; and
   measuring, at at least one frequency, amplitude and phase of a plurality of electromagnetic fields generated by the plurality of antenna elements of the DUT.

4. The method of claim 1, further comprising:
determining the set of reference DUT FF base functions by:
obtaining a set of reference DUT FF patterns generated by a plurality of antenna elements of a reference DUT under a set of different beamformer settings, such that the set of reference DUT FF patterns is useable to enable the calculation of a beamformer setting-specific FF pattern as a linear combination of the set of reference DUT FF patterns;
wherein the set of reference DUT FF patterns is the set of reference DUT FF base functions; and
generating the calibration coefficients by:
obtaining a series of a plurality of reference DUT probe-based field measurements of the wireless signals generated by the reference DUT under the set of different beamformer settings; and
processing the series of the plurality of reference DUT probe-based field measurements.

5. The method of claim 4, wherein the series of the reference DUT probe-based field measurements are processed by applying a singular value decomposition method.

6. The method of claim 4, wherein obtaining the set of reference DUT FF patterns generated by the plurality of antenna elements of the reference DUT under the different beamformer settings comprises:
for each antenna element n of the reference DUT,
configuring the reference DUT to radiate predominantly from the antenna element n using at least one beamformer setting; and
measuring far-field electromagnetic amplitude and phase produced by antenna element n at at least one frequency,
wherein the measurement of the far-field electromagnetic amplitude and phase produced by antenna element n using the at least one beamformer setting results in the reference DUT base function for the antenna element n.

7. The method of claim 6, further comprising:
for each antenna element n of the reference DUT:
minimizing radiation of the plurality of antenna elements of the reference DUT;
measuring FF electromagnetic amplitude and phase to determine a FF interference pattern;
subtracting the FF interference pattern from the far-field electromagnetic amplitude and phase produced by antenna element n using the at least one beamformer setting.

8. The method of claim 4, wherein obtaining the series of the plurality of reference DUT probe-based field measurements of the wireless signals generated by the reference DUT under the set of different beamformer settings comprises:
for each antenna element n of the reference DUT:
configuring the reference DUT to radiate only from the antenna element n at at least one frequency using the set of different beamformer settings; and
measuring the plurality of reference DUT probe-based field measurements produced by antenna element n at at least one frequency.

9. The method of claim 8, further comprising:
for each antenna element n of the reference DUT:
minimizing radiation of the plurality of antenna elements of the reference DUT;
measuring the plurality of reference DUT probe-based field measurements to determine a probe-based interference indication;
subtracting the interference indication from the plurality of reference DUT probe-based field measurements produced by antenna element n for the at least one beamformer setting.

10. The method of claim 4,
wherein the set of reference DUT FF patterns comprises phase and amplitude information, wherein the method further comprises:
obtaining a plurality of fixed reference FF measurements of the plurality of antenna elements of the reference DUT under the set of different beamformer settings,
utilizing phase information of the plurality of fixed reference FF measurements to obtain a reference phase for the phase information of the set of reference DUT FF patterns.

11. The method of claim 4,
wherein the set of reference DUT FF patterns comprises phase and amplitude information, wherein the method further comprises:
extracting phase information from an input signal driving the wireless signals generated by the DUT,
utilizing the phase information of the input signal to obtain a reference phase for the phase information of the set of reference DUT FF patterns.

12. The method of claim 1,
wherein the probe-based field measurements are obtained in the near-field (NF) of the DUT.

13. The method of claim 1,
wherein the wireless signals generated by the DUT are generated according to a plurality of sets of beamformer settings of the plurality of DUT antenna elements, and
wherein the plurality of sets of beamformer settings span a vector space of the sets of beamformer settings.

14. The method of claim 13,
wherein the plurality of sets of beamformer settings is equal or greater in number than the plurality of DUT antenna elements.

15. The method of claim 1,
wherein the plurality of probe-based field measurements comprises phase and amplitude information, wherein the method further comprises:
obtaining a plurality of reference probe field measurements of the wireless signals generated by the DUT,
utilizing phase information of the plurality of reference probe field measurements to obtain a reference phase for the phase information of the plurality of probe-based field measurements.

16. The method of claim 1,
wherein the plurality of probe-based field measurements comprises phase and amplitude information, wherein the method further comprises:
extracting phase information from an input signal driving the wireless signals generated by the DUT,
utilizing the phase information of the input signal to obtain a reference phase for the phase information of the plurality of probe-based field measurements.

17. A non-transitory computer readable memory medium comprising program instructions for determining a far-field (FF) pattern of wireless signals generated by a device under test (DUT), wherein the DUT includes an antenna array comprising a plurality of DUT antenna elements, wherein the program instructions are executable by a processor to:
obtain a plurality of probe-based near-field measurements of the wireless signals generated by the DUT, wherein the obtaining is performed by a probe antenna system (PAS) having a plurality of PAS antenna elements, wherein the plurality of PAS elements is equal to or greater than the plurality of DUT antenna elements;

compute a set of DUT FF scaling factors, using the plurality of probe-based near-field measurements and a set of calibration coefficients, a quantity of the set of DUT FF scaling factors being equal to a quantity of a set of reference DUT FF base functions;

determine the FF pattern of wireless signals based on the DUT FF scaling factors and the set of reference DUT base functions;

wherein the FF pattern of wireless signals generated by the DUT are useable to assess operation of the DUT in the FF.

18. The non-transitory computer readable memory medium of claim 17, wherein in obtaining the plurality of probe-based near-field measurements of the wireless signals generated by the DUT, the program instructions are executable to:

configure antenna elements of the DUT with certain beamformer settings while driving the beamformer with a signal; and measure, at at least one frequency, amplitude and phase of electromagnetic fields generated by the plurality of antenna elements of the DUT, with the PAS.

19. The non-transitory computer readable memory medium of claim 17, wherein the set of calibration coefficients are in the form of a reconstruction matrix;

wherein the program instructions are executable to compute a set of DUT FF scaling factors using the plurality of probe-based field measurements and the reconstruction matrix.

20. The non-transitory computer readable memory medium of claim 17, wherein the program instructions are executable to:

determine the set of reference DUT FF base functions by:
obtaining a set of reference DUT FF patterns generated by a plurality of antenna elements of the reference DUT under a set of different beamformer settings, such that the set of reference DUT FF patterns are useable to enable the calculation of a beamformer setting-specific FF pattern as a linear combination of the set of reference DUT FF patterns;
wherein the set of reference DUT FF patterns is the set of reference DUT FF base functions; and generate the calibration coefficients by:
obtaining a series of a plurality of reference DUT probe-based near-field measurements of the wireless signals generated by the reference DUT under the set of different beamformer settings; and
processing the series of the plurality of reference DUT probe-based near-field measurements.

21. The non-transitory computer readable memory medium of claim 20, wherein the program instructions are executable to process the series of the reference DUT probe-based near-field measurements by applying a singular value decomposition method.

22. The non-transitory computer readable memory medium of claim 20, wherein in obtaining the set of reference DUT FF patterns generated by the plurality of antenna elements of the reference wireless device under the different beamformer settings, the program instructions are executable to:

for each antenna element n of the reference wireless device,
configure the reference wireless device to radiate predominantly from the antenna element n using at least one beamformer setting; and
measure far-field electromagnetic amplitude and phase produced by antenna element n at at least one frequency, wherein the measurement of the far-field electromagnetic amplitude and phase produced by antenna element n using the at least one beamformer setting results in the reference DUT base function for the antenna element n.

23. The non-transitory computer readable memory medium of claim 20, wherein the program instructions are executable to:

for each antenna element n of the reference wireless device:
minimize radiation of the plurality of antenna elements of the reference DUT;
measure FF electromagnetic amplitude and phase to determine a FF interference pattern;
subtract the FF interference pattern from the far-field electromagnetic amplitude and phase produced by antenna element n using the at least one beamformer setting.

24. The non-transitory computer readable memory medium of claim 20, wherein in obtaining the series of the plurality of reference DUT probe-based field measurements of the wireless signals generated by the reference DUT under the set of different beamformer settings, the program instructions are executable to:

for each antenna element n of the reference DUT:
configure the reference DUT to radiate only from the antenna element n at at least one frequency using the set of different beamformer settings; and
measure the plurality of reference DUT probe-based near-field measurements produced by antenna element n at at least one frequency.

25. The non-transitory computer readable memory medium of claim 17, wherein the program instructions are executable to determine the FF pattern of wireless signals for each of a plurality of different polarizations.

26. A system for determining a far-field (FF) pattern of wireless signals generated by a device under test (DUT), wherein the DUT includes an antenna array comprising a plurality of DUT antenna elements, wherein the system comprises:

a testing apparatus which supports the DUT and a probe antenna system used for measuring electromagnetic signals produced by the DUT; and a computer system comprising a processor and memory, wherein the memory stores program instructions executable by the processor to:
obtain a plurality of probe-based near-field measurements of the wireless signals generated by the DUT, wherein the obtaining is performed by a probe antenna system (PAS) having a plurality of PAS antenna elements, wherein the plurality of PAS elements is equal to or greater than the plurality of DUT antenna elements;
compute a set of DUT FF scaling factors, using the plurality of probe-based near-field measurements and a set of calibration coefficients, a quantity of the set of DUT FF scaling factors being equal to a quantity of a set of reference DUT FF base functions;
determine the FF pattern of wireless signals based on the DUT FF scaling factors and the set of reference DUT FF base functions;
wherein the FF pattern of wireless signals generated by the DUT are useable to assess operation of the DUT in the FF.

* * * * *